United States Patent
Gehani et al.

(10) Patent No.: US 8,904,373 B2
(45) Date of Patent: Dec. 2, 2014

(54) METHOD FOR PERSISTING SPECIFIC VARIABLES OF A SOFTWARE APPLICATION

(76) Inventors: Samir Gehani, Cupertino, CA (US); Tyler C. Rayner, San Jose, CA (US)

(*) Notice: Subject to any disclaimer, the term of this patent is extended or adjusted under 35 U.S.C. 154(b) by 370 days.

(21) Appl. No.: 13/221,174

(22) Filed: Aug. 30, 2011

(65) Prior Publication Data
US 2013/0054908 A1 Feb. 28, 2013

(51) Int. Cl.
  G06F 9/44 (2006.01)
  G06F 11/14 (2006.01)
(52) U.S. Cl.
  CPC .......... G06F 11/1438 (2013.01); G06F 9/4435 (2013.01)
  USPC ............ 717/168; 717/116; 711/161; 707/640
(58) Field of Classification Search
  CPC . G06F 9/4443; G06F 3/0481; G06F 3/04812; G06F 3/0484; G06F 3/00; G06F 3/048; G06F 3/06; G06F 2003/00; G06F 8/34; G06F 9/445; G06F 9/44521
  USPC .......... 717/120, 121, 116, 165; 707/E17.001, 707/E17.005; 714/15; 715/765–769
  See application file for complete search history.

(56) References Cited

U.S. PATENT DOCUMENTS

| | | | | |
|---|---|---|---|---|
| 5,990,888 A * | 11/1999 | Blades et al. | | 715/764 |
| 6,226,665 B1 * | 5/2001 | Deo et al. | | 718/106 |
| 6,513,152 B1 * | 1/2003 | Branson et al. | | 717/100 |
| 6,675,295 B1 * | 1/2004 | Marcelais et al. | | 713/2 |
| 6,766,514 B1 * | 7/2004 | Moore | | 717/159 |
| 7,111,243 B1 * | 9/2006 | Ballard et al. | | 715/744 |
| 7,725,869 B1 | 5/2010 | Milne et al. | | |
| 8,677,065 B1 * | 3/2014 | Cousins | | 711/114 |
| 2002/0152228 A1 * | 10/2002 | Lopez et al. | | 707/202 |
| 2004/0006649 A1 * | 1/2004 | Cirne | | 709/310 |
| 2004/0081201 A1 * | 4/2004 | Simonnet et al. | | 370/469 |
| 2005/0210373 A1 * | 9/2005 | Litwiller | | 715/512 |
| 2007/0006078 A1 * | 1/2007 | Jewsbury et al. | | 715/716 |
| 2007/0050498 A1 * | 3/2007 | Claise | | 709/224 |
| 2007/0162785 A1 * | 7/2007 | Downer et al. | | 714/15 |
| 2008/0133622 A1 * | 6/2008 | Brown et al. | | 707/204 |
| 2008/0229285 A1 * | 9/2008 | Housser | | 717/125 |

(Continued)

OTHER PUBLICATIONS

Automatic Prefetching by Traversal Profiling in Object Persistence Architectures—Ali Ibrahim and William R. Cook Department of Computer Sciences, University of Texas at Austin—D. Thomas (Ed.): ECOOP 2006, LNCS 4067, pp. 50-73, 2006.*

*Primary Examiner* — Lewis A Bullock, Jr.
*Assistant Examiner* — Francisco Aponte
(74) *Attorney, Agent, or Firm* — Womble Carlyle Sandridge & Rice, LLP

(57) ABSTRACT

Some embodiments of the invention provide a variable persister that allows an application running on a device to efficiently make a set of variables persistent across termination and relaunch of the application. According to some embodiments of the invention, an application executing on the device can utilize this archiving service by simply having its persisted variables declared in the application's code as variables that are to be persisted. Based on such declarations, the variable persisting service of the device stores the values of the set of persisted variables in a non-volatile storage archive (e.g., disk, flash storage, etc.) when the application terminates, and retrieves these values from the archive when the application restarts such that the values of the persisted variables are restored to a state before the application was last terminated.

24 Claims, 16 Drawing Sheets

(56) References Cited

U.S. PATENT DOCUMENTS

| | | | |
|---|---|---|---|
| 2008/0263089 A1* | 10/2008 | Cousins | 707/103 R |
| 2009/0113408 A1 | 4/2009 | Toeroe | |
| 2010/0107095 A1* | 4/2010 | Singh et al. | 715/764 |
| 2010/0115334 A1* | 5/2010 | Malleck et al. | 714/15 |
| 2011/0022785 A1 | 1/2011 | Riedmann et al. | |
| 2011/0307875 A1* | 12/2011 | Xu et al. | 717/151 |
| 2012/0254733 A1* | 10/2012 | Tucovic | 715/243 |
| 2012/0260202 A1* | 10/2012 | Jiang et al. | 715/765 |

* cited by examiner

```
var X = 0; // not persisted persistent var Y = "White"; // persisted locally and/or in the cloud, as determined
                            // by the operating system local persistent var Z = "Left"; // forced to persist locally cloud persistent var A = 50%; // forced to persist in the cloud function modify_X (new_X) {
    X = new_X;
} function modify_Y (new_Y) {
    Y = new_Y;
} function modify_Z (new_Z) {
    Z = new_Z;
}

METHOD FOR PERSISTING SPECIFIC VARIABLES OF A SOFTWARE APPLICATION

BACKGROUND

When an application is executed on a device, the application often declares and instantiates variables that represent the state of the application or settings of the application that are customizable by users. These variables are usually assigned with initial values (i.e., default values) to represent the initial state or settings of the application when the application is initiated. As the application runs, the values of these variables may change to represent a different state of the application and/or a changed setting by the user. For instance, the state of the application is changed when one or more document files are opened or closed by the application, or when the window location of an opened document file is changed. Similarly, the setting of the application is changed when the user selects a different appearance of the graphical user interface (GUI) of the application.

Often times, the users of the application would like to have the changed state of the application and the changed settings persist across termination and relaunch of the application, so that the application will operate under the latest (most updated) state and settings (rather than the default state and settings) the next time the application is initiated. In order for the application to operate under the customized settings each time it is launched, the variables that have been updated must be saved on a disk before the application is terminated and retrieved from the disk when the application is initiated.

Historically, applications that persist the customized settings have to be coded extensively to implement the archiving and unarchiving of the variables that represent the state settings of the application. Specifically, the author of the applications must write numerous lines of programming code to perform the archiving and unarchiving operations. Such coding is often time consuming and prone to causing errors.

BRIEF SUMMARY

Some embodiments of the invention provide a variable persister that allows an application running on a device to efficiently make a set of variables persistent across termination and relaunch of the application. To do this, the persister of some embodiments stores the values of the set of persisted variables in a non-volatile storage archive (e.g., disk, flash storage, etc.) when the application terminates, and retrieves these values from the archive when the application restarts such that the values of the persisted variables are restored to a state before the application was last terminated. In some embodiments, the persister also automatically archives the latest values of the set of persisted variables to the non-volatile storage (e.g., disk, flash storage, etc.) from time to time when the application is running. This periodic archiving while the application is running allows the persisted variables to be mostly retained even when the application crashes (i.e., quits abnormally without following the normal termination procedure) or when the application is suddenly terminated by the operating system during a fast shutdown of the device.

The variable persister in some embodiments is an archiving service that is provided on a device. According to some embodiments of the invention, an application executing on the device can utilize this archiving service by simply having its persisted variables declared in the application's code as variables that are to be persisted. Based on such declarations, the variable persisting service of the device can identify persisted variables during the launch and termination of the application, as well as during the periodic storage of the running application's state.

In some embodiments, the persister is a service that an operating system of the device provides to applications that execute on top of the operating system. The persister in some embodiments is part of the framework of the operating system that provides a runtime environment for the applications. In other embodiments, the persister is not part of the operating system, but is part of, or is, an application running (i.e., executing) on top of the operating system.

In some embodiments, an application may declare and instantiate many variables when the application is executed. Some of these variables are objects or contained within an object. Persisted variables in some embodiments represent different settings of the application, different values that are stored in one or more instances of a user-generated document and other data structures (e.g., data files created and saved by the user) associated with the application, or application state data related to a user interaction with the application at a particular time in a particular interaction. Application settings are configurations that are particular to the execution of the application. Some examples of application settings are locations of a set of tool icons, a particular appearance of the graphical user interface (GUI) of the application, etc. Examples of user-generated documents and other data structures include text documents created by text editing applications, tables created by spreadsheet applications, slide presentations created by presentation editing applications, photo albums created by photo organizing applications, video presentations created by video editing applications, etc. Examples of user-interaction, application-state data include cursor location and window location of a text document at a particular time in a particular interaction with a text editing application, etc.

In some embodiments, the persister stores the persisted variables of the application in a non-volatile storage of the device that runs the application (i.e., archiving locally). In other embodiments, instead of or in addition to archiving the persisted variables in the local device, the persister stores the persisted variables of the application in a non-volatile storage of a different device that is connected to the device that runs the application over a network, such as the Internet (i.e., archiving in a cloud). In these embodiments, archiving the persisted variables involves sending the values of the persisted variables over the network in order to store the variables in the designated non-volatile storage of the networked device.

Different embodiments store the persisted variables in different locations in the non-volatile storage. Some embodiments are implemented on a device that allows document based applications and non-document based applications to execute. Document based applications are applications that can run multiple instances at a time (e.g., a text editing application that can open multiple text documents at a time). A non-document based application, on the other hand, is an application that can only run as a single instance at any given time (e.g., a game application that can only run one instance of the game at a time).

In some embodiments, the persister stores persisted variables that represent application settings in the system files of the application, while storing in a user-generated document persisted variables that represent values in the user-generated document, and application state data that is related to the user-generated document. Alternatively, some embodiments do not store persisted variables of the application state data in the associated user-generated document file, but store the persisted variables of the application state data in a separate file that is linked to the user-generated document file.

In some embodiments, the application has a default value for each persisted variable. Whenever the application launches (and when a user generated document is opened), some embodiments automatically load the persisted variables initially with their default values, and then replace these default values with the latest values of these variables that were persisted last for them by the persister in the last persistence operation (which may have occurred during the termination of the application or the last periodic persistence of the application while it was running). Other embodiments, however, might load the persisted variables differently. For instance, after archiving new values for the persisted variables, some embodiments do not initially load default values for these persisted variables, but rather just directly load the values that were stored last by the persister for these variables. Yet other embodiments might directly load the persisted values for some persisted variables, while for other persisted variables, they might initially load default values and replace these values with the persisted values.

Some embodiments allow the application to control when to load the archived values of the persisted variables by using syntax extensions or calling application programming interface (APIs) functions of the framework within the programming code. In these embodiments, the persister does not automatically perform the unarchiving operation when the application launches, but rather, loads the archived values of the persisted variables only when instructed to do so by the application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 2 illustrates an example of declaring a variable persistent in a programming code.

DETAILED DESCRIPTION

Figure 1:
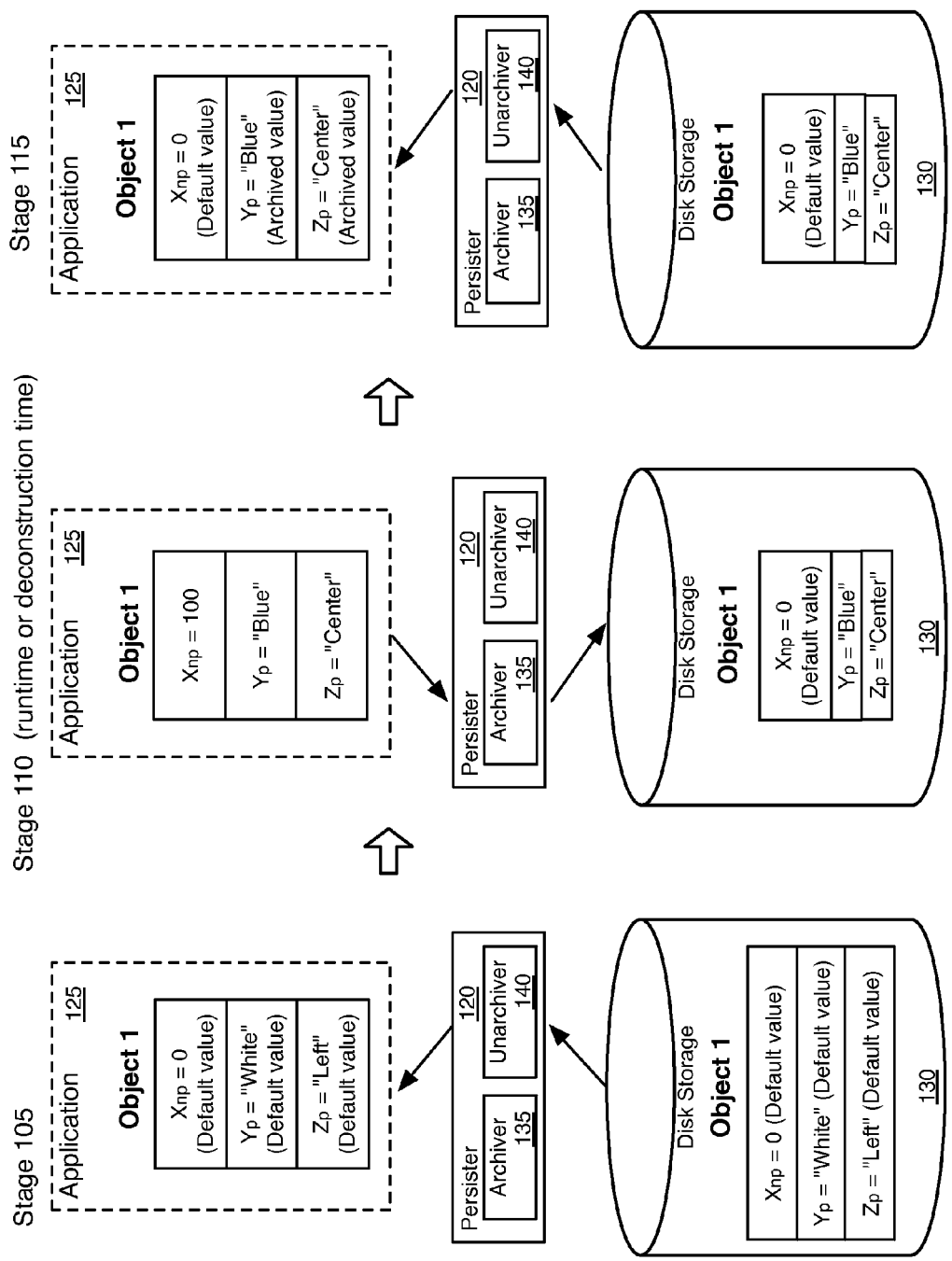
FIG. 1 illustrates an example of archiving and unarchiving persisted variables by a variable persister of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a variable persister that allows an application running on a device to efficiently make a set of variables persistent across termination and relaunch of the application. To do this, the persister of some embodiments stores the values of the set of persisted variables in a non-volatile storage archive (e.g., disk, flash storage, etc.) when the application terminates, and retrieves these values from the archive when the application restarts such that the values of the persisted variables are restored to a state before the application was last terminated. In some embodiments, the persister also automatically archives the latest values of the set of persisted variables to the non-volatile storage (e.g., disk, flash storage, etc.) from time to time when the application is running. This periodic archiving while the application is running allows the persisted variables to be mostly retained even when the application crashes (i.e., quits abnormally without following the normal termination procedure) or when the application is suddenly terminated by the operating system during a fast shutdown of the device. In some embodiments, the device on which the persister is implemented may be a computer, a handheld device, a tablet, a smartphone, etc.

The variable persister in some embodiments is an archiving service that is provided on a device. According to some embodiments of the invention, an application executing on the device can utilize this archiving service by simply having its persisted variables declared in the application's code as variables that are to be persisted. Based on such declarations, the variable persisting service of the device can identify persisted variables during the launch and termination of the application, as well as during the periodic storage of the running application's state. FIG. 2 below illustrates an example of how persisted variables may be declared in an application's code.

In some embodiments, the persister is a service that an operating system of the device provides to applications that execute on top of the operating system. The persister in some embodiments is part of the framework of the operating system that provides a runtime environment for the applications. In other embodiments, the persister is not part of the operating system, but is part of, or is, an application running (i.e., executing) on top of the operating system.

In some embodiments, an application may declare and instantiate many variables when the application is executed. Some of these variables are objects or contained within an object. Persisted variables in some embodiments represent different settings of the application, different values that are stored in one or more instances of a user-generated document and other data structures (e.g., data files created and saved by the user) associated with the application, or application state data related to a user interaction with the application at a particular time in a particular interaction. Application settings are configurations that are particular to the execution of the application. Some examples of application settings are locations of a set of tool icons, a particular appearance of the graphical user interface (GUI) of the application, etc. Examples of user-generated documents and other data structures include text documents created by text editing applications, tables created by spreadsheet applications, slide presentations created by presentation editing applications, photo albums created by photo organizing applications, video presentations created by video editing applications, etc. Examples of user-interaction, application-state data include cursor location and window location of a text document at a particular time in a particular interaction with a text editing application, etc.

In some embodiments, the persister stores the persisted variables of the application in a non-volatile storage of the device that runs the application (i.e., archiving locally). In other embodiments, instead of or in addition to archiving the persisted variables in the local device, the persister stores the persisted variables of the application in a non-volatile storage of a different device that is connected to the device that runs the application over a network, such as the Internet (i.e., archiving in a cloud). In these embodiments, archiving the persisted variables involves sending the values of the persisted variables over the network in order to store the variables in the designated non-volatile storage of the networked device.

Different embodiments store the persisted variables in different locations in the non-volatile storage. Some embodiments are implemented on a device that allows document based applications and non-document based applications to execute. Document based applications are applications that can run multiple instances at a time (e.g., a text editing application that can open multiple text documents at a time). A non-document based application, on the other hand, is an application that can only run as a single instance at any given time (e.g., a game application that can only run one instance of the game at a time).

In some embodiments, the persister stores persisted variables that represent application settings in the system files of the application, while storing in a user-generated document persisted variables that represent values in the user-generated document, and application state data that is related to the user-generated document. Alternatively, some embodiments do not store persisted variables of the application state data in the associated user-generated document file, but store the persisted variables of the application state data in a separate file that is linked to the user-generated document file.

In some embodiments, the application has a default value for each persisted variable. Whenever the application launches (and when a user generated document is opened), some embodiments automatically load the persisted variables initially with their default values, and then replace these default values with the latest values of these variables that were persisted last for them by the persister in the last persistence operation (which may have occurred during the termination of the application or the last periodic persistence of the application while it was running) Other embodiments, however, might load the persisted variables differently. For instance, after archiving new values for the persisted variables, some embodiments do not initially load default values for these persisted variables, but rather just directly load the values that were stored last by the persister for these variables. Yet other embodiments might directly load the persisted values for some persisted variables, while for other persisted variables, they might initially load default values and replace these values with the persisted values.

Some embodiments allow the application to control when to load the archived values of the persisted variables by using syntax extensions or calling application programming interface (APIs) functions of the framework within the programming code. In these embodiments, the persister does not automatically perform the unarchiving operation when the application launches, but rather, loads the archived values of the persisted variables only when instructed to do so by the application.

FIG. 1 conceptually illustrates the operations of a variable persister 120 at three stages 105, 110, and 115. Specifically, FIG. 1 includes the persister 120, an application 125 and a disk storage 130. As shown, the persister 120 includes an archiver 135 and an unarchiver 140.

The first stage 105 illustrate the application 125 after it has been initiated for the first time. When the application 125 is executed, the application 125 declares an object that includes variable X, variable Y, and variable Z. Among these variables, the application 125 declares that variables Y and Z are persisted variables. In this example, the application 125 declares each individual variable as either persistent or not persistent. In some embodiments, an application may declare an object in its entirety as persistent, such that each variable within the object becomes persistent.

In some embodiments, the application 125 includes default values for the variables that are stored in the disk storage 130. As shown, the disk storage 130 includes variable X with a default value of 0, variable Y with a default value of "White", and variable Z with a default value of "Left". As the application is starting, the unarchiver 140 of the persister 120 retrieves the default values of the variables from the disk storage 130 and applies values to the application 125. After the unarchiver 140 applies the retrieved values to the application 125, variable X now has a default value of 0, persisted variable Y has a default value of "White", and persisted variable Z has a default value of "Left".

The second stage 110 illustrates a state of the application 125 after the application 125 has been operating for a period of time. At this time, the values of the variables in object 1 have been changed (either by the user of the application or by the application itself) during the course of running the application. Specifically, variable X now has a value of 100 instead of the default value 0, variable Y has a value of "Blue" instead of the default value "White", and variable Z has a value of "Center" instead of the default value "Left". The second stage 110 also shows that the persister 120 performs an archiving operation for application 125 (either during a periodic persistence operation while application 125 is running or when the application 125 is terminating). As shown, the archiver 135 of the persister 120 archives the latest values of the variables that application 125 has declared as persistent. Specifically, the archiver 135 saves the latest values of variables Y and Z of object 1 to disk storage 130 because these variables have been declared as persistent. Although the second stage 110 of this figure shows that the persisted variables Y and Z are stored together with non-persisted variable X, in some embodiments, the persisted values are stored separately from the non-persisted variables. The different ways of storing the variables will be discussed in more detail below by reference to FIG. 7.

The third stage 115 illustrates a state of the application 125 when the user is restarting the application 125 again after the application 125 has been terminated. Similar to the first stage 105 of this figure, the unarchiver 140 of the persister 120 retrieves the default and archived values of the variables from the disk storage 130 and applies them to the application 125 as the user initiates the application 125. As shown, the disk storage 130 includes the archived values of persisted variables Y and Z that the archiver 135 has previously stored. As a result of the unarchiver 140 retrieving and applying the persistent variables to application 125, variable X of object 1 still has the default value of 0 because variable X is not a persisted variable, variable Y now has the archived value of "Blue" instead of the default value because variable Y is a persisted variable, and variable Z now has the archived value of "Center" instead of the default value because variable Z is a persisted variable.

As mentioned above, the persister of some embodiments provides a mechanism for an author of the application to declare a set of variables to be persistent within the programming code. Different embodiments provide different mechanisms for an application to declare a variable persistent. In some embodiments, a variable may be declared as persistent by being associated with a keyword within the programming code. FIG. 2 illustrates several examples of declaring variables by showing a portion of pseudo code. As shown in the first line of the pseudo code, variable X is declared and instantiated with a value of 0. Since no persistent keyword is associated with this variable, variable X is a non-persisted variable. The next line of the programming code illustrates an example of declaring variable Y as a persisted variable by associating the variable with a keyword "persistent". As mentioned above, the persister of some embodiments may store a persisted variable locally (i.e., within a disk storage of a device that runs the application) or store the persisted variable in a cloud (i.e., within a disk storage of a different device that is connected to the device that runs the application over a network). Some embodiments also allow the author of the application to specify whether to store the variable locally or in a cloud by associating a different keyword with the variable. As shown in the next several lines in the pseudo code, in addition to the "persistent" keyword, variable Z is also associated with a keyword "local" which indicates to the persister that this variable should be stored locally. Variable A is associated with a different keyword "cloud", which indicates to the persister that this variable should be stored in a cloud, rather than storing locally at the device that runs the application.

FIG. 2 only illustrates one example mechanism to allow an application to declare a variable persistent. Other embodiments may use different methods (e.g., allowing the application to create a list that contains all persisted variables, etc.) for an application to declare a variable persistent in the programming code.

Figure 3:
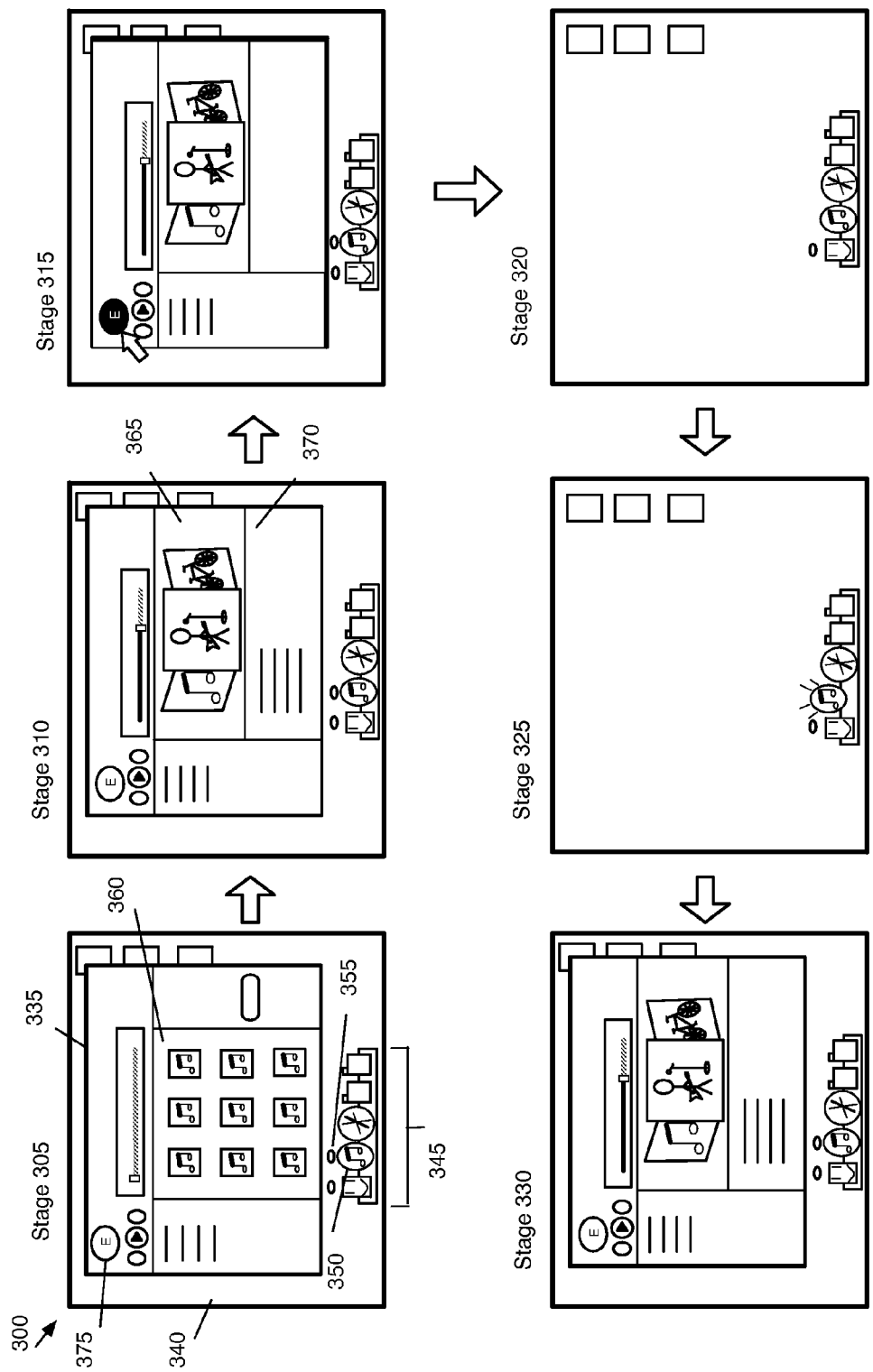
FIG. 3 illustrates an example of archiving and unarchiving persisted variables for a media player application by a variable persister of some embodiments.
Figure 4:
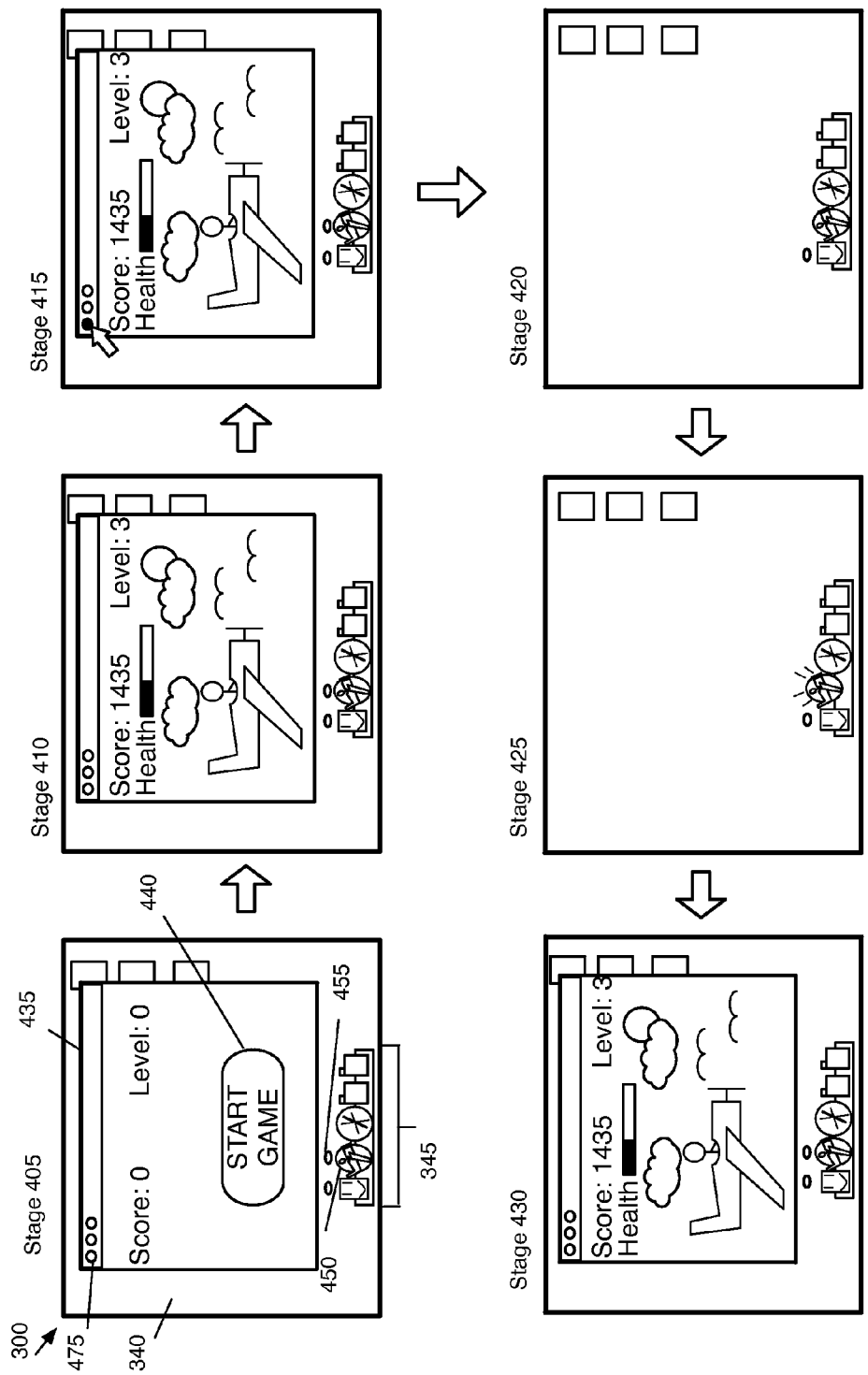
FIG. 4 illustrates an example of archiving and unarchiving persisted variables for a game application by a variable persister of some embodiments.

FIGS. 1 and 2 illustrate the functionalities and operations of the persister. FIGS. 3 and 4 illustrate some example features and benefits of the persister of some embodiments when the persister is operated on different applications. Specifically, FIG. 3 illustrates the operations of the persister through a graphical user interface (GUI) 300 of an operating system that includes the persister of some embodiments at six different stages 305, 310, 315, 320, 325, and 330. Each of these stages will be described in more detail below.

As shown in FIG. 3, the GUI 300 includes a desktop area 340 of the operating system of a device for the user to interact with the operating system and its applications. When an application is executed within the operating system, the application may provide its own GUI that appears on the desktop area 340 to interact with the user. The GUI 300 also includes a dock 345 within the desktop area 340. The dock 345 includes a group of application icons (including a media player icon 350) that provide easy access to some of the applications and indicate which applications are currently running. In some embodiments, the user can initiate an application by selecting the icon that corresponds to the application on the dock 345.

The operation of the persister will now be described by reference to the state of this GUI 300 during the six stages 305, 310, 315, 320, 325, and 330. The first stage 305 shows the GUI 300 after the user has initiated a media player application (e.g., by selecting the media player icon 350). The initiation of the media player application is indicated by the GUI 335 of the media player application appearing on the desktop 340 and a blue light 355 appearing on top of the media player icon 350. As shown, the GUI 335 of the media player application includes an exit button 375 for terminating the application and a browser display area 360 for browsing media clips on the computer.

During the initiation of the application, the media player application declares and instantiates a set of objects and variables. Some of the instantiated variables define the settings of the GUI 335 of the application. For instance, the media player application may include a "browser view" variable that defines the look and feel of the browser display area 360. In this example, the "browser view" variable has a default value of "grid view", which instructs the media player application to configure the browser display area 360 to display small icons that represent different media clips in a grid (in rows and columns).

Although the media player application displays the browser display area 360 in a "grid view" in the first stage 305, the user can change the look and feel of the browser display area 360 through the GUI 335 (e.g, by making a selection in a drop down menu, on a tool bar, etc.). In some embodiments, the selection of a different view causes the value of the "browser view" variable to change. The media player application in turn changes the look and feel of the browser display area 360 based on the new value of the "browser view" variable.

As mentioned above, one of the features of the persister is the ability to allow an application to declare any variables as persistent in the programming code. In this example, the media player application has declared the "browser view" variable as persistent so that when the user changes the appearance of the browser display area 360, the application can restore to that appearance the next time it is initiated.

The second stage 310 illustrates the GUI 335 after the user has selected a different look and feel for the display area 365.

Specifically, the user has changed the browser view from the "grid view" to the "cover view". The selection causes the media player application to change the value of the "browser view" variable from "grid view" to "cover view". As a result, the media player application changes the look and feel of the browser display area 360 based on the new value of the "browser view" variable. As shown, the browser display area 360 is now split into two areas: a top area 365 and a bottom area 370. The top area 365 includes large icons that represent different media clips on the computer system. The bottom area 370 provides a list of descriptions for the different media clips.

The third stage 315 illustrates the GUI 300 of the operating system when the user is terminating the media player application by selecting the exit button 375, as indicated by the highlighting of the exit button 375. In this third stage 315, as the media player application is terminating, the persister archives the latest values of the variables that the media player application has declared to be persistent. In this example, since the media player application has declared the variable "browser view" to be persistent, the persister stores the variable "browser view" with its latest value—"cover view"—in a non-volatile storage (e.g., disk, flash storage, etc.).

The fourth stage 320 is a transitional stage after the media player application has been completely terminated. As shown, the GUI 335 of the media player application has disappeared from the desktop 340 and the blue light 355 has disappeared from the top of the media player icon 350.

In the fifth stage 325, the user has initiated the media player application again (e.g., by selecting the media player icon 350), as indicated by the animated media player icon 350 in the dock. When the media player application is initiating, the persister of some embodiments retrieves the variables that were persisted last for the application by the persister. In this example, the persister retrieves the variable "browser view" having the persisted value of "cover view" from the non-volatile storage. Furthermore, the persister applies this archived variable to the application. In some embodiments, the persister applies the archived variable to the application by updating the variable that was instantiated by the application with the persisted value. In this example, the persister updates the "browser view" variable of the application with the persisted value of "cover view" so that the media player application now has the persisted value "cover view" instead of the default value "grid view" for the variable "browser view".

The sixth stage 330 shows the GUI 300 after the media player application has completed its initiation, as indicated by the GUI 335 of the media player application appearing on the desktop 340 and the blue light 355 appearing on top of the media player icon 350. As a result of the persister retrieving and applying the archived value of the variable "browser view" for the media player application, the media player application displays the browser display area 360 in the "cover view" setting, instead of the default "grid view" setting.

FIG. 3 illustrates the features of the persister through its operations on a media player application. FIG. 4 illustrates some other features of the persister through its operations on a game application. Specifically, FIG. 4 illustrates the operations of the persister through a graphical user interface (GUI) 300 of an operating system that includes the persister at six different stages 405, 410, 415, 420, 425, and 430.

The GUI 300 in FIG. 4 is identical to the GUI 300 of FIG. 3, except that the dock 345 has a game icon 450 representing the game application. The first stage 405 shows the GUI 300 after the user has initiated the game application by selecting the game icon 450. The initiation of the game application is indicated by the GUI 435 of the game application appearing on the desktop 340 and a blue light 455 appearing on top of the game icon 450. As shown, the GUI 435 of the game application includes an exit button 475 for terminating the game application and a start game icon 440 for initiating a new game. In addition, the GUI 435 also shows the score and the game level for the current user.

Similar to the media player application of FIG. 3, the game application declares and instantiates a set of objects and variables at the initiation of the application. Some of the instantiated variables define specific information of a user of the application. For instance, the game application may include a "user score" variable that defines the current score of a particular user, and a "user game level" variable that defines the current game level for the particular user. In this example, because the user has just started the game application for the first time, the "user score" has a value of 0 and the "user game level" variables have a value of 0. As a result, the game application displays the current score of 0 and the current game level of 0 in the GUI 435.

One of the features of the persister is the ability to allow the author of an application to declare any variable as persistent in the programming code. In this example, the game application has declared the "user score" variable and the "user game level" variable as persistent. As the user begins to play the game within the game application, the two variables "user score" and "user game level" will be changed.

The second stage 410 illustrates the GUI 435 after the user has started playing the game for a period of time. At this stage, the user has been playing at game level 3 and has accumulated a total score of 1435. The values of the "user score" variable and the "user game level" variable are updated in real time to reflect the current state of the game for the user. Consequently, the game application displays the score and game level of the user on the GUI 435 based on the most current values of the two variables. As shown, the GUI 435 displays a score of 1435 and a game level of 3.

The third stage 415 illustrates the GUI 300 of the operating system when the user is terminating the game application by selecting the exit button 475 (as indicated by the highlighting of the exit button 475). In this third stage 415, as the game application is terminating, the persister archives the latest values of the variables that the game application has declared to be persistent. In this example, since the game application has declared the "user score" and the "user game level" variables as persisted variables, the persister stores these variables with their latest values in a non-volatile storage (e.g., disk, flash storage, etc.).

The fourth stage 420 is a transitional stage after the game application has been completely terminated. As shown, the GUI 435 of the game application has disappeared from the desktop 340 and the blue light 455 has disappeared from the top of the game icon 450.

In the fifth stage 425, the user has initiated the game application again by selecting the game icon 450, as indicated by the animated game icon 450 in the dock. When the game application is initiating, the persister retrieves the variables that were persisted last by the persister in the non-volatile storage. In this example, the persister retrieves the "user score" variable and the "user game level" variable from the disk. Furthermore, the persister applies these archived variables to the game application so that the game application uses the archived values of the two variables instead of the default values.

The sixth stage 430 shows the GUI 300 after the game application has completed its initiation, as indicated by the GUI 435 of the game application appearing on the desktop 340 and the blue light 455 appearing on top of the game icon 450. As a result of the persister retrieving and applying the archived values of the "user score" variable and the "user game level" variable for the game application, the game application begins with where the user has left off before the termination of the application. In addition, the GUI 435 of the game application displays the user score of 1435 (instead of the default value of 0) and the game level of 3 (instead of the default value of 0).

Several more detailed embodiments are described below. Section I describes details of the archiving and unarchiving operations of some embodiments. Section II then describes the software architecture of a persister of some embodiments. Finally, Section III describes an electronic system with which some embodiments of the invention are implemented.

I. Archiving and Unarchiving

A. Archiving

Figure 5:
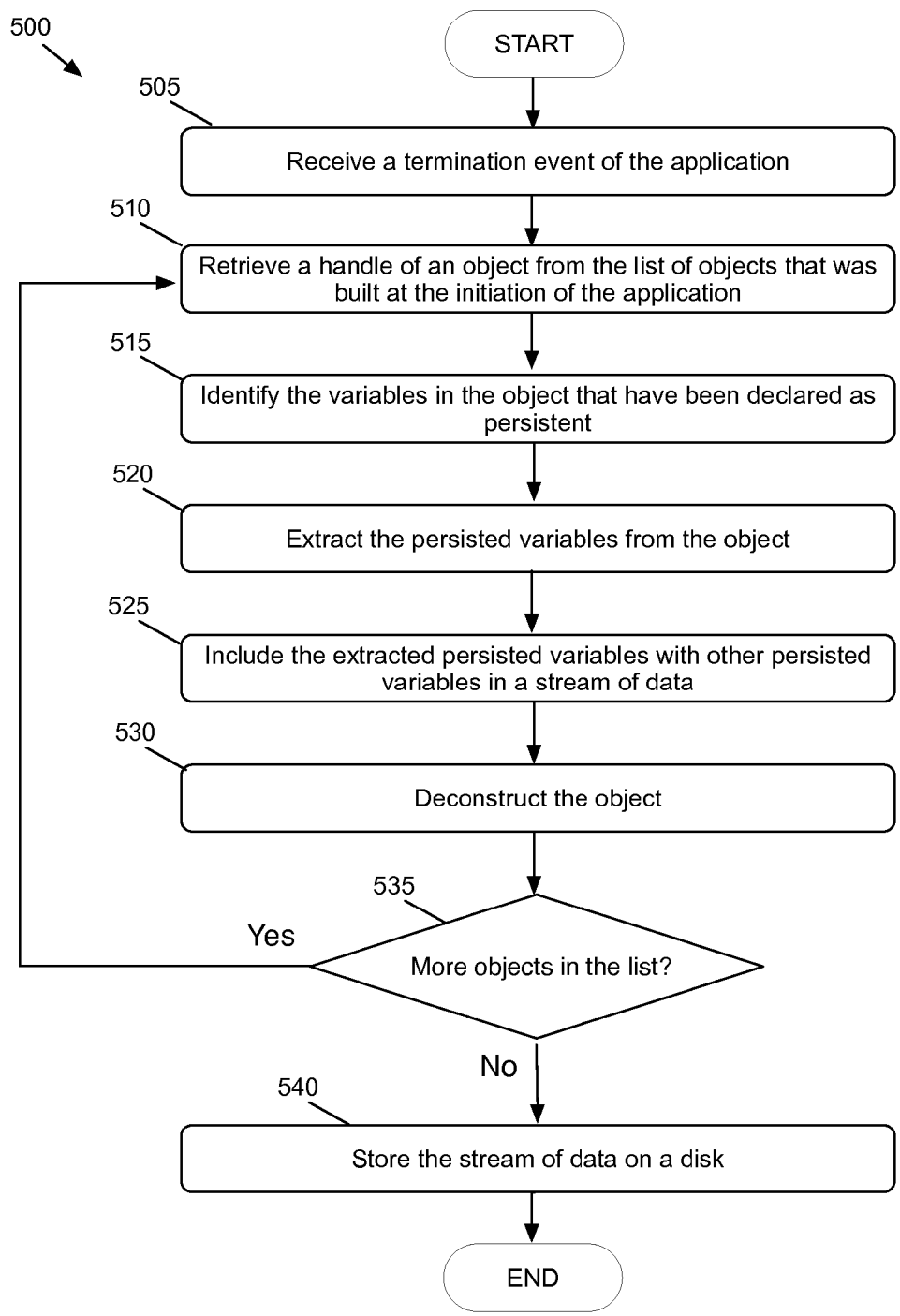
FIG. 5 illustrates a process of some embodiments for archiving persisted variables for an application when the application is terminating.
Figure 6:
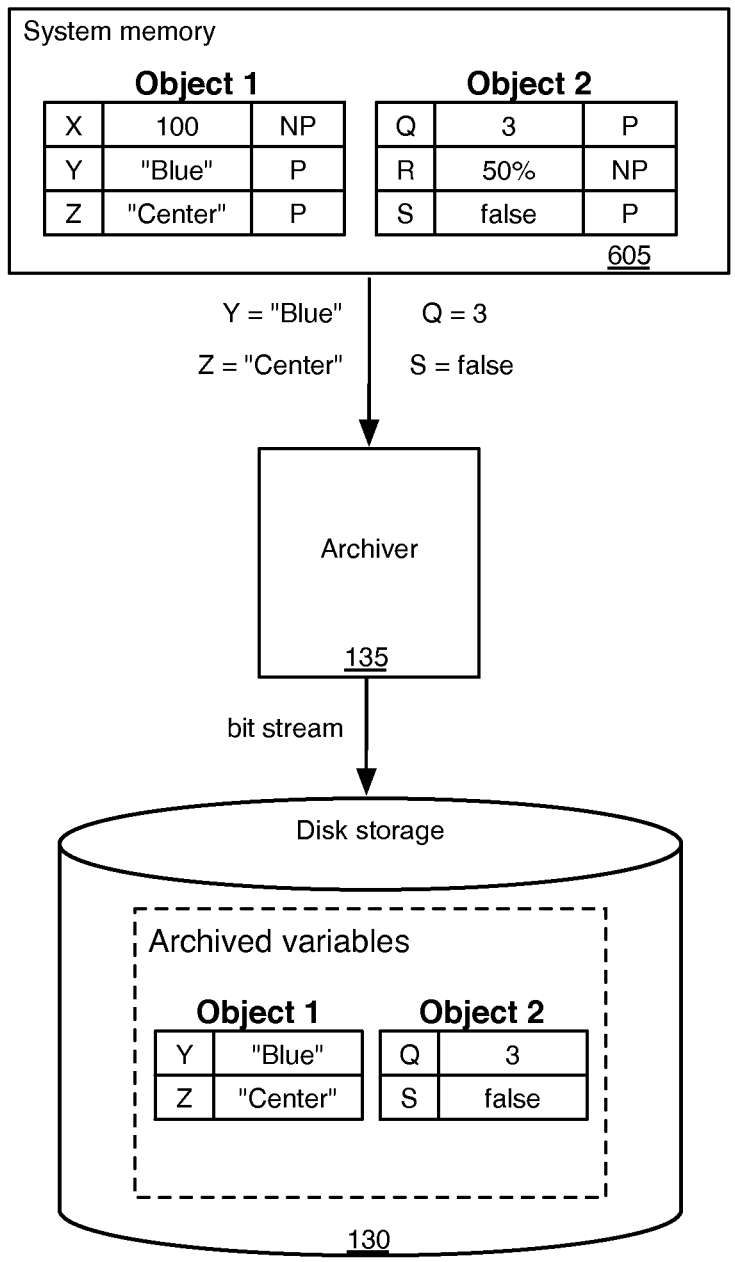
FIG. 6 conceptually illustrates a data flow of archiving persisted variables for an application.

As mentioned above, the persister of some embodiments provides a service that automatically archives a set of persisted variables of an application when the application is terminating. FIG. 5 conceptually illustrates an example of such a process. Specifically, FIG. 5 illustrates a process 500 of some embodiments for archiving a set of persisted variables for an application. In some embodiments, the process 500 is automatically performed by the archiver of a persister for an application when the application is terminating. The process 500 will now be described by reference to FIG. 6. FIG. 6 illustrates an example dataflow of the persisted variables during an archiving operation.

The process 500 illustrates the operation of archiving a set of persisted variable for an application in which all the constructs are objects. Thus, all variables within the applications are objects, or exist within an object. However, the persister of some embodiments can also perform the archiving operation for applications that include both objects as well as other variables that are not objects or variables that exist within an object, as well as applications that do not include objects at all (e.g., applications written using imperative/procedural programming, rather than object-oriented programming).

As shown, the process 500 begins by receiving (at 505) a termination event of the application. In some embodiments, a termination event occurs when a user of the application quits (or exits) the application or when the user of the application closes a document associated with the application. Upon receiving such a termination event, the archiver archives all of the persisted variables of the application.

Next, the process retrieves (at 510) a handle of an object of the application from a list of objects that was created at the initiation of the application. When the application is initiated, the archiver of some embodiments creates a list that includes persisted objects and objects containing persisted variables. In some embodiments, the list includes the name and location of the objects, and the location of the file to which the archived variables are to be saved. As the application is terminating, the process 500 uses the created list to retrieve all of the application's objects that include persisted variables.

For the retrieved object, the process identifies (at 515) the variables in the object that have been declared as persistent. In some embodiments, the process determines whether a variable is persistent or not persistent by checking whether the variable is associated with a "persistent" keyword when the variable is declared. In some embodiments, each variable of the application includes a persistence attribute that indicates whether the variable is persistent or not persistent. In these embodiments, the process determines whether a variable is persistent or not persistent by checking the persistence attribute of the variable.

FIG. 6 illustrates the data flow of the persisted variables when the archiver is performing the process 500. Specifically, FIG. 6 includes system memory 605, an archiver 135, and a disk storage 130. In some embodiments, the system memory 605 is a volatile storage of the device that runs the application (e.g., random access memory, etc.) and the disk storage 130 is a non-volatile storage of a device (e.g., disk, flash storage, etc.). As mentioned above, the archiver of some embodiments is configured (either by the operating system of the device or specified by the application) to store the persisted variables in the local device (i.e., archiving locally). In these embodiments, the non-volatile storage is a non-volatile storage of the device that runs the application. In other embodiments, the archiver is configured (either by the operating system of the device or specified by the application) to store the persisted variables in a different device over a network (i.e., archiving in a cloud). In these embodiments, the non-volatile storage is a non-volatile storage of a different device that is connected to the device that runs the application.

As shown, the system memory 605 stores two instantiated objects of an application when the application is running. Object 1 includes a non-persisted variable X having a value of 100, a persisted variable Y having a value of "Blue", and a persisted variable Z having a value of "Center". Furthermore, object 2 includes a persisted variable Q having a value of 3, a non-persisted variable R having a value of 50%, and a persisted variable S having a value of false. In some embodiments, each instantiated variable includes an attribute that indicates whether the variable has been declared as persistent or not. In these embodiments, the archiver 135 identifies the persisted variables by checking the value of the persistence attribute of each variable. Since both objects contain persisted variables, the archiver has included both objects to the list of objects created when the application is initiated.

The process 500 then extracts (at 520) the persisted variables from the object. Next, the process includes (at 525) the extracted persisted variables with other persisted variables in a stream of data. In some embodiments, the stream of data is for writing to a file in a non-volatile storage.

Referring to FIG. 6, the archiver 135 extracts variables Y and Z from object 1 and variables Q and S from object 2 because the application has declared these variables as persistent. The archiver 135 includes each of the extracted variables into a stream of data with other persisted variables for storing in the disk storage 130.

The process 500 next deconstructs (at 530) the object. In some embodiments, the deconstruction of an object involves releasing system resources such as memory, GPU locks, and locks on network interfaces that have been allocated for the object. In some embodiments, deconstructing an object involves disengaging the object from other objects, etc. so that the other objects will not message the deconstructed object about events that occur for which the deconstructed object was registered.

Next, the process determines (at 535) if there are more objects that have persisted variables in the list. If there are more objects in the list, the process returns to 515 to retrieve a handle of another object, and will cycle through operations 510-530 until all of the objects in the list are processed.

If there are no more objects in the list, the process stores (at 540) the stream of data on a disk. Then the process ends. Referring to FIG. 6, after the archiver 135 has included all persisted variables from the objects in the list into a stream of data, the archiver 135 sends the stream of data to the disk storage 130. As shown, the disk storage 130 includes persisted variable Y with the latest value of "Blue", persisted variable Z with the latest value of "Center", persisted variable Q with the latest value of 3, and persisted variable S with the latest value of false.

Figure 7:
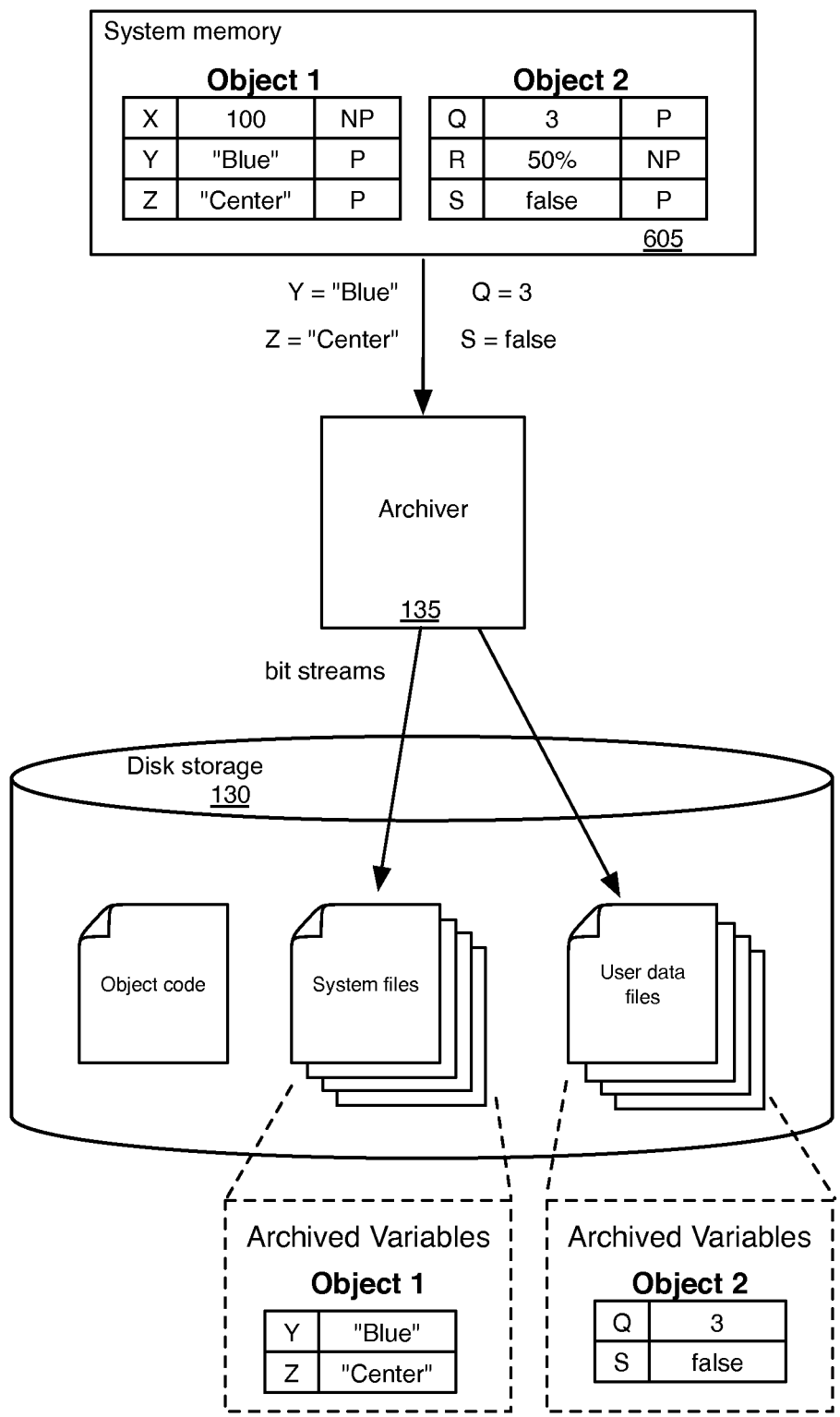
FIG. 7 conceptually illustrates another data flow of archiving persisted variables for an application.

FIG. 6 shows the disk storage 130 to only include the archived variables in order not to obscure the description with unnecessary detail. However, in some embodiments, the disk storage that stores the archived variables may also store the object code of the application, application settings, and user generated data for the application. FIG. 7 illustrates a system that is identical to the one in FIG. 6, except that the disk storage 130 includes an object code file (e.g., an executable file), a set of system files, and a set of user data files for the application. The object code file of some embodiments is stored under a directory of the file structure of the operating system along with other object code files of other applications. In some embodiments, the system files of an application, which store application setting information for the application, are stored with other system files of the operating system in an area that is hidden away from the user in order to prevent the user from directly modifying the files. Furthermore, the user generated data is usually stored in a location specified by the user.

In some embodiments, the archiver 135 stores all extracted persisted variables in a single file (e.g., the archived variables file) that is separate from the object code, application settings, and user generated data, regardless of the types of the persisted variables. In these embodiments, the archiver combines all persisted variables into one stream of data and writes it to a single file on a disk. In other embodiments, the archiver may store different types of variables into different files that are associated with the application. For instance, the archiver may store persisted variables that represent the application settings and stores these persisted variables in the system setting file. The archiver may also store persisted variables that represent values of different user generated documents and application state data related to the respective user generated documents. Alternatively, the archiver may not store persisted values that represent the application state data in the associated user-generated document file, but stores the persisted variables of the application state data in a separate file that is linked to the user-generated file. In these embodiments, the archiver writes different types of persisted variables into different streams of data and stores the different streams of data into the different files associated with the application.

As shown in FIG. 7, after the archiver 135 extracted the persisted variables from the objects, the archiver creates multiple streams of data for different types of persisted variables to be written into files. In this example, the archiver 135 stores the persisted variables of object 1 in the system file and stores the persisted variables of object 2 in the user data file.

FIG. 7 illustrates that the archiver 135 stores the persisted variables in the same disk storage 130 that stores the object code of the application (i.e., archiving locally). In this example, the disk storage 130 is the disk storage of the device that runs the application. In some embodiments, instead of, or in addition to, storing the persisted variables in the local disk storage, the archiver 135 stores the persisted variables in a disk storage of another device that is connected to the device that runs the application over a network (i.e., archiving in a cloud). As mentioned above by reference to FIG. 2, the persister of some embodiments may be configured to automatically archive the persisted variables locally and/or over the network. In other embodiments, the persister may allow the application to specify whether the persisted variables should be archived in a local disk storage or over the network by using language syntax in the programming code (e.g., associating a different keywords to the variable).

As mentioned above, the process 500 is described for an application in which all the constructs are objects. For other types of applications in which some variables are not objects or within an object, the persister may retrieve each variable of the application that the application has declared to be persistent, include the values of the persisted variables in the stream of data, and store the stream of data on the disk.

Figure 8:
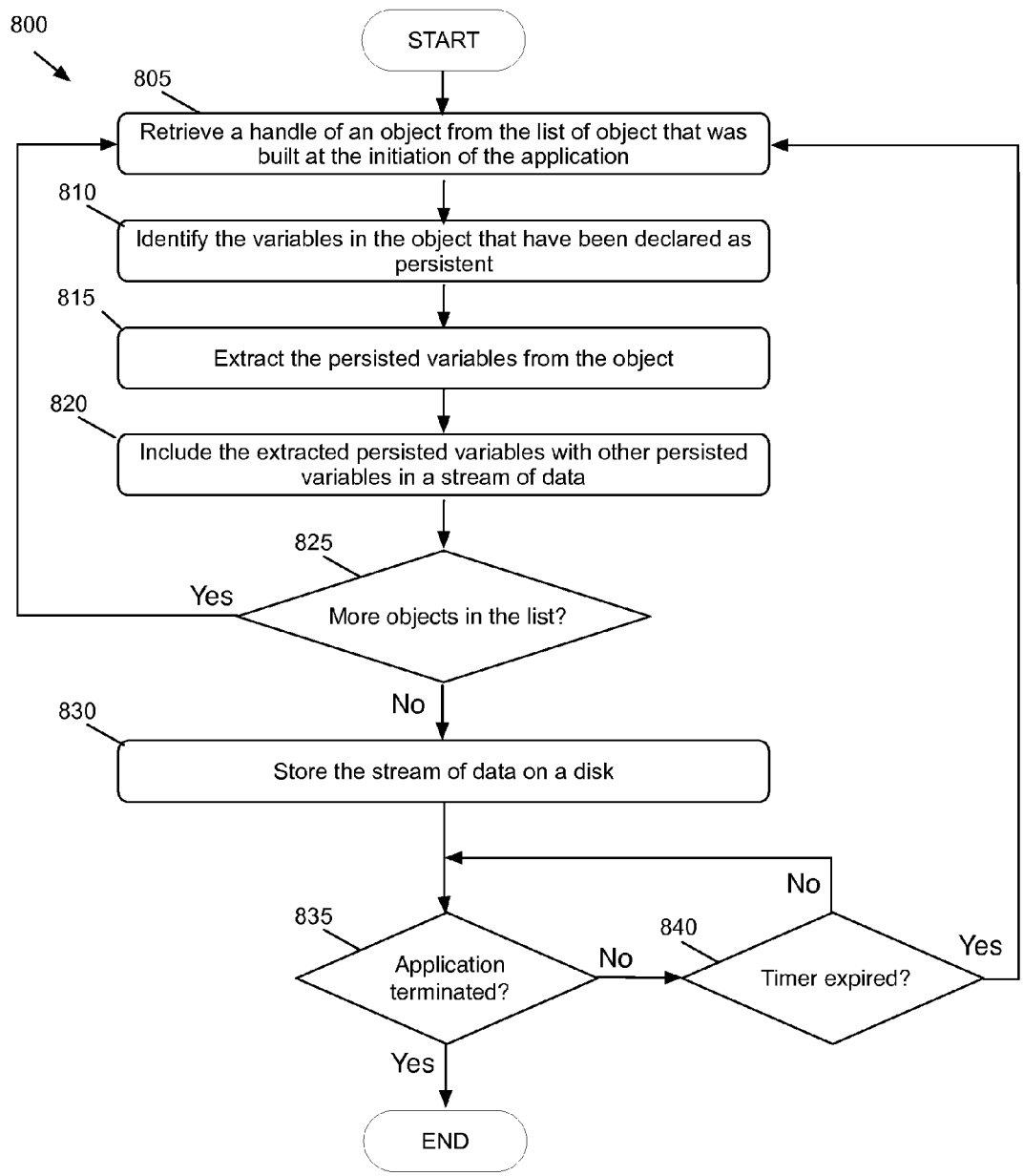
FIG. 8 illustrates a process of some embodiments for archiving persisted variables for an application periodically when the application is running.

FIG. 5 illustrates a process for archiving the persisted variables when the application is terminating. As mentioned above, some embodiments also perform the archiving operations for an application periodically when the application is running (e.g., every 5 minutes when the application is running) This periodic archiving while the application is running allows the persisted variables to be mostly retained even when the application crashes (i.e., quits abnormally without following the normal terminating procedure), or when the application is suddenly terminated by the operating system in a fast shutdown of the device that runs the application. In these embodiments, the persister is triggered by a timer to archive the most updated values of the persisted variables. FIG. 8 conceptually illustrates a process for archiving the persisted variables when the application is running.

The process 800 illustrates the operation of archiving a set of persisted variable for an application in which all the constructs are objects. Thus, all variables within the application are objects, or exist within an object. However, the persister of some embodiments can also perform the archiving operation for applications that include both objects as well as other variables that are not objects or variables that exist within an object, as well as applications that do not include objects at all (e.g., applications written using imperative/procedural programming, rather than object-oriented programming).

The process 800 begins by retrieving (at 805) a handle of an object from the created list. As mentioned above, the archiver of some embodiments creates a list that includes objects containing persisted variables for an application when the application is initiated. The process 800 uses this created list during this operation to retrieve to retrieve all persisted variables and objects that include persisted variables.

For the retrieved object, the process identifies (at 810) the variables in the object that have been declared as persistent. In some embodiments, the process determines whether a variable is persistent or not persistent by checking whether the variable is associated with a "persistent" keyword when the variable is declared. In other embodiments, the process determines whether a variable is persistent by checking the persistence attribute of the variable.

The process then extracts (at 815) the persisted variables from the object. Next, the process includes (at 820) the extracted persisted variables with other persisted variables in a stream of data. As mentioned, the process of some embodiments includes all the persistened variables into one stream of data while other embodiments include different types of persisted variables in different streams of data. In some embodiments, the streams of data are for writing to a file on a disk.

Next, the process determines (at 825) if there are more objects in the list. If there are more objects in the list, the process returns to 805 to retrieve a handle of another object, and will cycle through operations 805-820 until all of the objects in the list are processed.

If there are no more objects in the list, the process stores (at 830) the stream of data on a disk. After storing the stream of data on the disk, the process determines (at 835) if the application is terminated. The application may be terminated normally (i.e., by a user quitting the application) or abnormally (i.e., the application crashing or suddenly terminating due to circumstances of the operating system or the device in which the application runs).

If the application is terminated, the process ends. If the application is not terminated, the process determines (at 840) if the timer has expired. The archiver of some embodiments performs the archiving operation at a predetermined interval (e.g., every five minutes) when the application is running. Therefore, the archiver uses a timer to determine when to archive the persisted variables for the application. If the time has expired, the process returns to 805 to retrieve a handle of an object from the created list, and will cycle through operations 805-835 until the timer has expired. If the timer has not expired, the process returns to 835 to determine if the application is terminated.

As mentioned above, the process 800 is described for an application in which all the constructs are objects. For other types of applications in which some variables are not objects or within an object, the persister may retrieve each variable of the application that the application has declared to be persistent, include the values of the persisted variables in the stream of data, and store the stream of data on the disk.

B. Unarchiving

Figure 9:
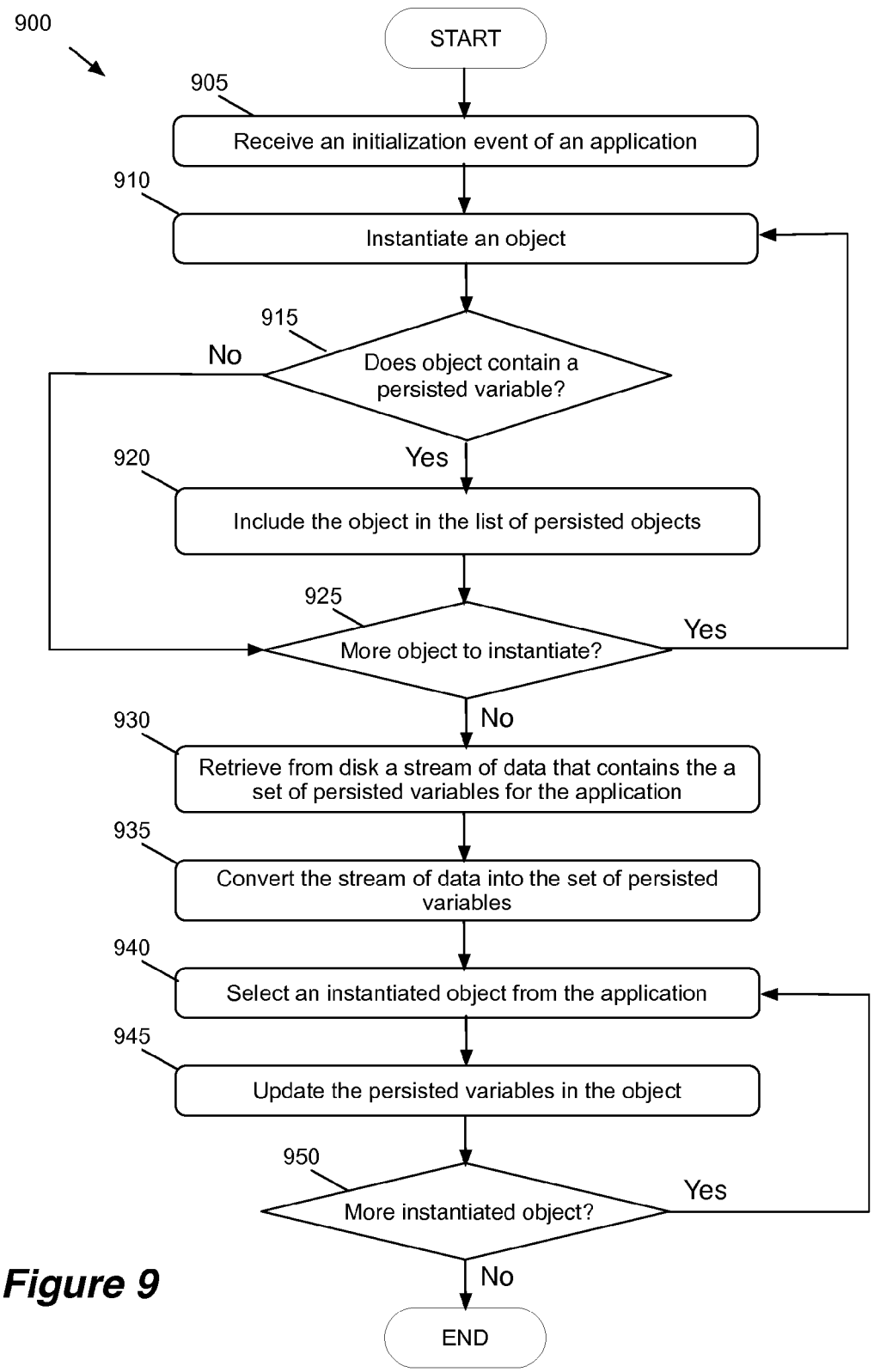
FIG. 9 illustrates a process of some embodiments for unarchiving persisted variables for an application when the application is initiated.
Figure 10:
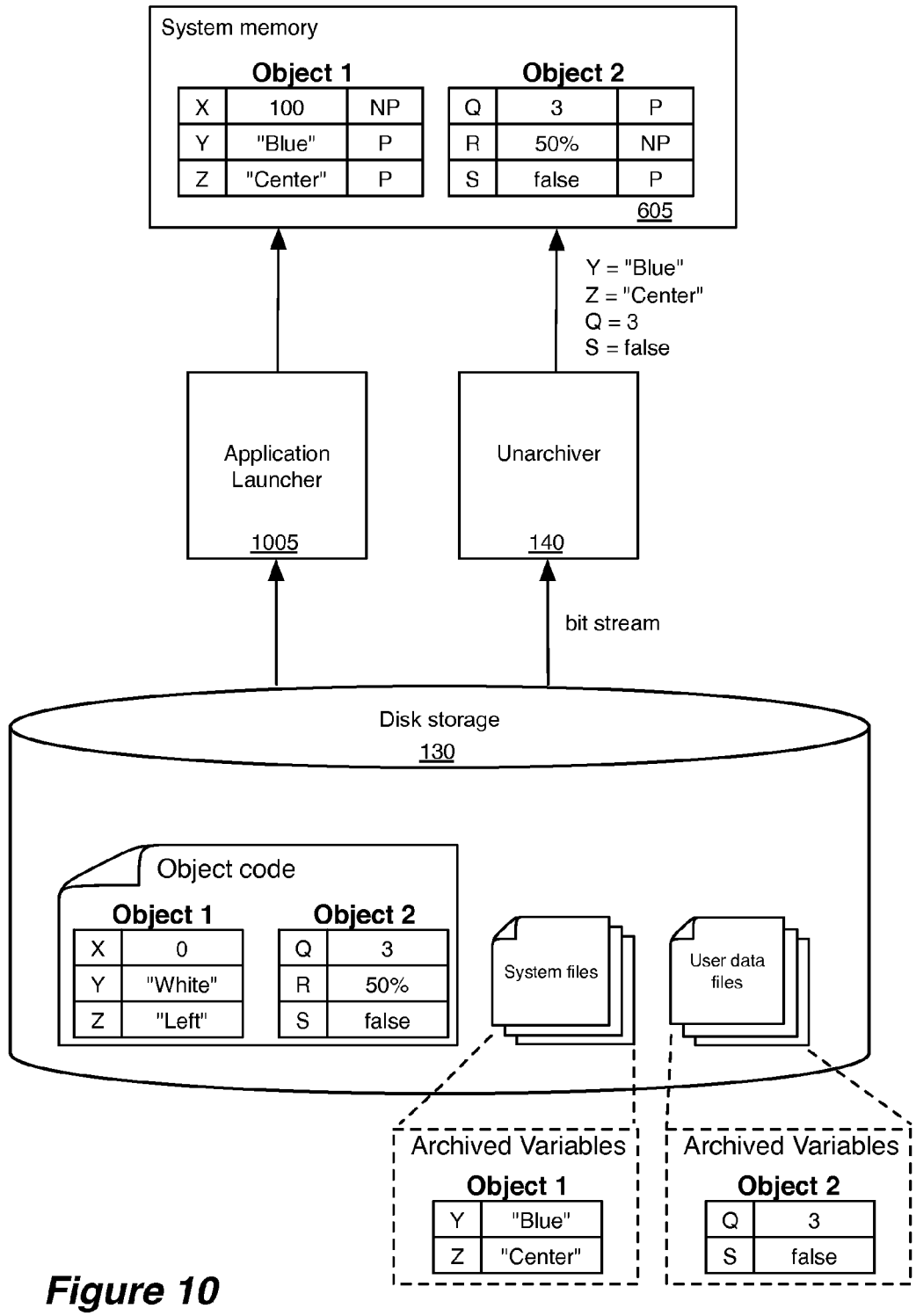
FIG. 10 conceptually illustrates a data flow of unarchiving persisted variables for an application.

FIGS. 5, 6, 7 and 8 illustrate the different aspects of archiving a set of persisted variables by the archiver of the persister. FIG. 9 conceptually illustrates a process 900 of some embodiments for unarchiving a set of persisted variables for an application that runs on a device. In some embodiments, the unarchiver of a persister performs the process 900 when an application is initiated or when a document associated with the application is opened. In these embodiments, the process 900 is triggered by an initiation event of the application. The process 900 will be described below by reference to FIG. 10. FIG. 10 illustrates an example dataflow of the persisted variables during an unarchiving operation.

The process 900 illustrates the operation of unarchiving a set of persisted variable for an application in which all the constructs are object. Thus, all variables within the application are objects, or exist within an object. However, the persister of some embodiments can also perform the unarchiving operation of other types of applications in which some variables are not objects or within an object.

As shown, the process 900 begins by receiving (at 905) an initialization event of an application. In some embodiments, an initialization event occurs when the user initiates the application, or opens a document associated with the application (e.g., by selecting the application from a desktop GUI or from a menu of applications, by selecting a document associated with the application from a folder window, etc.).

Next, the process instantiates (at 910) an object for the application. As mentioned above, an application may declare several variables and/or objects at the initiation of the application. In some embodiments, the process instantiates the objects (and/or variables) for the application.

The process then determines (at 915) whether the instantiated object contains a persisted variable. If the object contains a persisted variable, the process includes (at 920) the object in the list of persisted objects. This list of persisted objects is created to be used when the persister archives the persisted variables for the application when the application terminates, or periodically when then application runs.

Then, the process determines (at 925) whether there are more objects to be instantiated. If there are more objects to be instantiated, the process returns to 910 to instantiate another object, and will cycle through operations 910-925 until there are no more objects to be instantiated.

If the process determines that the object does not contain any persisted variables at 915, the process proceeds directly to 925 to determine if there are more objects to be instantiated. In some embodiments, the process also assigns default values to the instantiated variables.

Next, the process retrieves (at 930) from the disk a stream of data that contains a set of variables for the application. In some embodiments in which the persister archives the persisted variables in multiple streams of data (that is written into multiple files), the process retrieves the multiple streams of data during this operation.

The process next (at 935) converts the stream of data into the set of persisted variables. Referring to FIG. 10, FIG. 10 illustrates the data flow of the persisted variables when the unarchiver is performing the process 900. As shown, FIG. 10 includes system memory 605, an unarchiver 140, an application launcher 1005, and a disk storage 130. The disk storage 130 includes an object code file (e.g., an executable file), a set of system files, and a set of user generated data files for the application. The object code file contains instructions that when executed will instantiate a set of objects and variables in the system memory. For this application, the object code contains two objects: object 1 and object 2. Object 1 includes variable X with a default value of 0, variable Y with a default value of "White", and variable Z with a default value of "Left". Object 2 includes variable Q with a default value of 3, variable R with a default value of 50%, and variable S with a default value of false. As the application is initiated, the set of variables of the application are instantiated with the default values in the system memory 605, as shown in the figure.

The system files and user data files file contain different types of persisted variables that the archiver has last stored. As shown, the system file includes persisted variables of object 1 and the user data file includes persisted variables of object 2. Object 1 includes variable Y with a current value of "Blue" and variable Z with a current value of "Center". Object 2 includes variable Q with a current value of 3 and variable S with a current value of false. When the application is initiated, the application launcher loads the program code of the application from the disk storage 130 to the system memory 605. The application instantiates the objects and their variables with the stored default values. The unarchiver 140 then retrieves one or more bit streams that contain the archived variables from the disk storage 130. In this example, the unarchiver 140 retrieves the persistent variables from the system files and the user data files of the application. However, in some embodiments, the archiver stores all or some of the persisted variables in a separate file. In these embodiments, the unarchiver 140 also retrieves the persistent variables from the separate file.

Furthermore, the unarchiver 140 may retrieve the persisted variables from the files that are stored in a local device if the persister is configured to archive locally (i.e., storing the persisted variables on a disk of the device that runs the application), or retrieve the persisted variables from the files that are stored in a networked device if the persister is configured to archive in a cloud (i.e., storing the persisted variables on a disk of a different device that is connected to the device that runs the application over a network).

Referring back to FIG. 9, the process 900 next selects (at 940) an instantiated object from the application. The process then updates (at 945) the persisted variables in the object with the archived values. Next, the process determines (at 950) whether there are more instantiated objects of the application. If there are more instantiated objects, the process returns to 940 to receive another instantiated object, and will cycle through operations 940-945 until all of the instantiated objects of the application are updated. If there are no more instantiated objects, the process ends.

Referring to FIG. 10, the unarchiver 140 receives instantiated objects 1 and 2 from the system memory 605. For object 1, the unarchiver 140 updates persisted variable Y with the archived value of "Blue" and updates persisted variable Z with the archived value of "Center". Similarly for object 2, the unarchiver 140 updates persisted variable Q with the archived value 3 and updates persisted variable S with the archived value false.

FIGS. 9 and 10 illustrate the unarchiving operation in which the application launcher first loads the persisted variables with the default values, and the unarchiver updates the variables with the archived values. In other embodiments, the application launcher may not initially load the default values for the persisted variables, but rather communicates with the unarchiver and loads the values that were stored last by the persister for these variables. Yet other embodiments might directly load the persisted values for some persisted variables, while for other persisted variables, they might initially load default values and replace these values with the persisted values.

As mentioned above, the process 900 is described for an application in which all the constructs are objects. For other types of applications in which some variables are not objects or within an object, the persister may identify all the persisted variables of the application when the variables are instantiated during the launch of the application. The persister may then update the value of each persisted variable of the application with the archived value.

Figure 11:
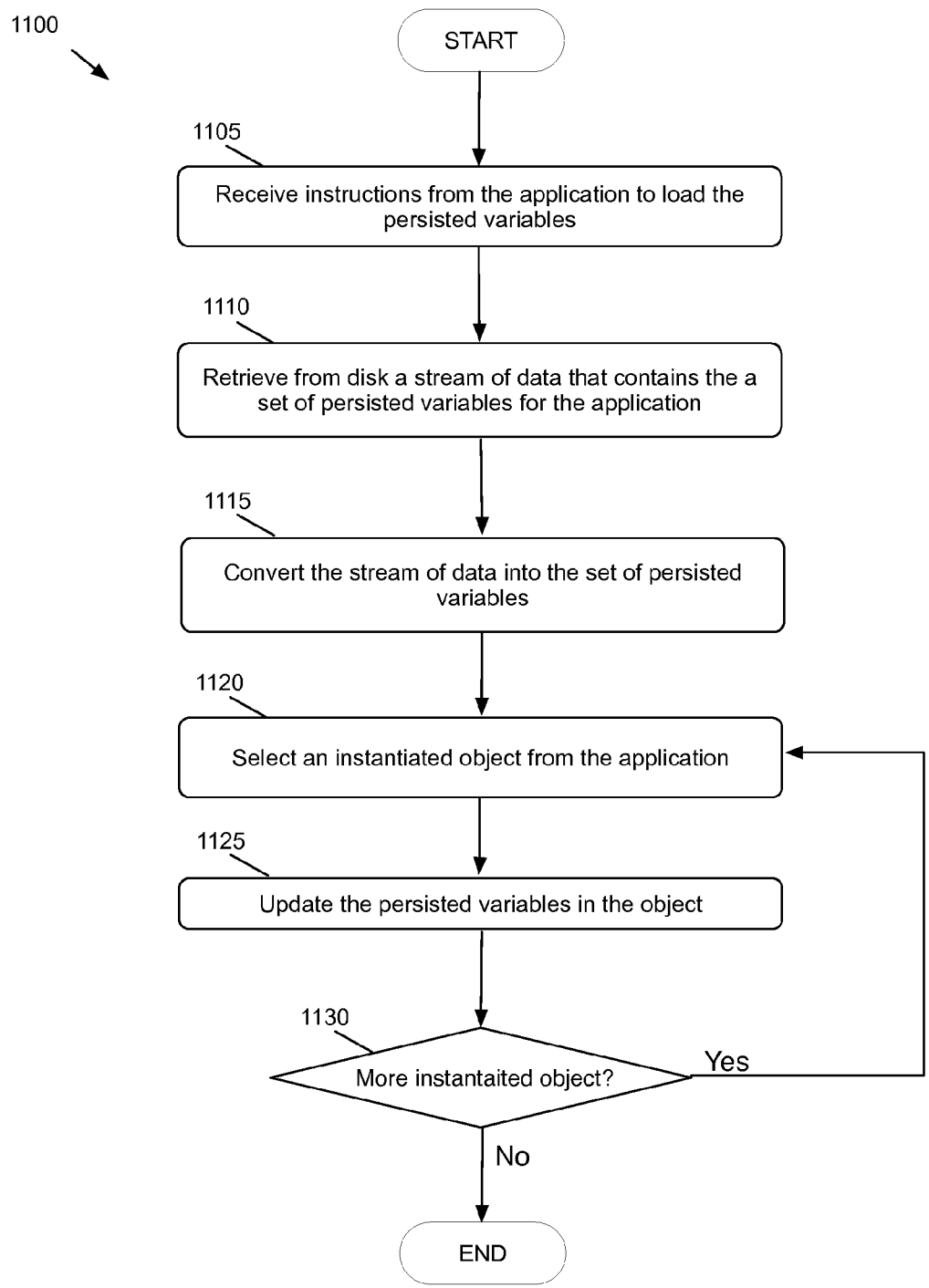
FIG. 11 illustrates a process of some embodiments for unarchiving persisted variables for an application when the application is running.

FIG. 9 illustrates the operation of unarchiving a set of persisted variables for an application at the initiation of the application. Instead of automatically unarchiving the persisted variables when the application restarts, some embodiments allow the application to specify when to unarchive the persisted variables during the runtime of the application. These embodiments allow the application to postpone the loading of all persisted variable values until after the application has completely initiated in order to prevent slow performance during the launching of the application. Furthermore, these embodiments also allow the application to persist variables that are declared and instantiated after the application is initiated (i.e., the application may instruct the persister to unarchive the variables after the variables have been declared and instantiated). In these embodiments, the application may instruct the persister to load the persisted variables using syntax extensions or application programming interface (APIs) of the framework within the programming code. FIG. 11 conceptually illustrates a process 1100 of some embodiments for unarchiving a set of persisted variables for an application when the application is running.

The process 1100 illustrates the operation of unarchiving a set of persisted variable for an application in which all the constructs are object. Thus, all variables within the applications are objects, or exist within an object. However, the persister of some embodiments can also perform the unarchiving operation for applications that include both objects as well as other variables that are not objects or variables that exist within an object, as well as applications that do not include objects at all (e.g., applications written using imperative/procedural programming, rather than object-oriented programming).

In some embodiments, the persister performs the process 1100 when it receives instructions from the application to unarchive the persisted variables. As such, the process 1100 begins by receiving (at 1105) instructions from the application to load the persisted variables of the application. As mentioned above, the application may instruct the persister of some embodiments to load the persisted variables using syntax extensions or application programming interface (APIs) of the framework within the programming code. In these embodiments, the persister receives the instructions by receiving programming syntax for loading the persisted variables or receiving the API function call from the application.

Next, the process retrieves (at 1110) from the disk a stream of data that contains a set of persisted variables for the application. In some embodiments in which the persister archives the persisted variables in multiple streams of data (that is written into multiple files), the process retrieves the multiple streams of data during this operation. The process next (at 1115) converts the stream of data into the set of persisted variables.

The process then selects (at 1120) an instantiated object from the application. After selecting an object, the process updates (at 1125) the persisted variables in the object with the archived values. Next, the process determines (at 1130) whether there are more instantiated objects of the application. If there are more instantiated objects, the process returns to 1120 to receive another instantiated object, and will cycle through operations 1120-1125 until all of the instantiated objects of the application are updated. If there is no more instantiated object, the process ends.

As mentioned above, the process 1100 is described for an application in which all the constructs are objects. For other types of applications in which some variables are not objects or within an object, the persister may select each persisted variable (that is identified during the launch of the application as part of the process 900 of FIG. 9) of the application when instructed by the application, and update the variable with the archived value.

C. Different Types of Applications

Figure 12:
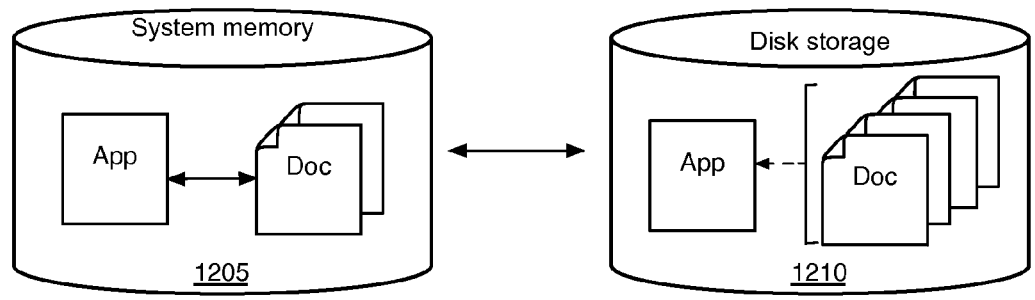
FIG. 12 illustrates of different types of applications storing and accessing data files.
Figure 12:
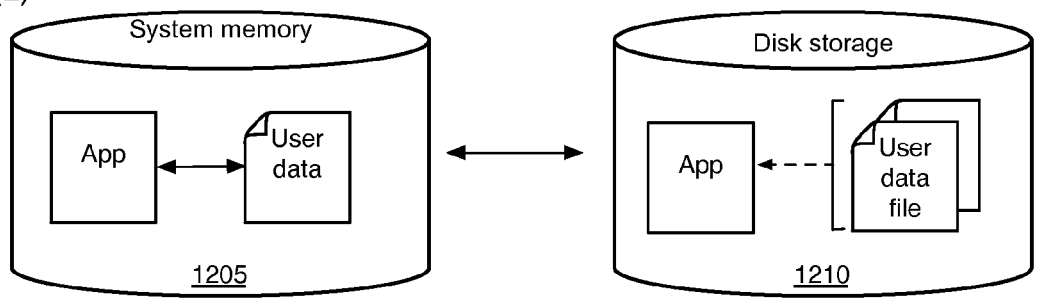
Figure 12:
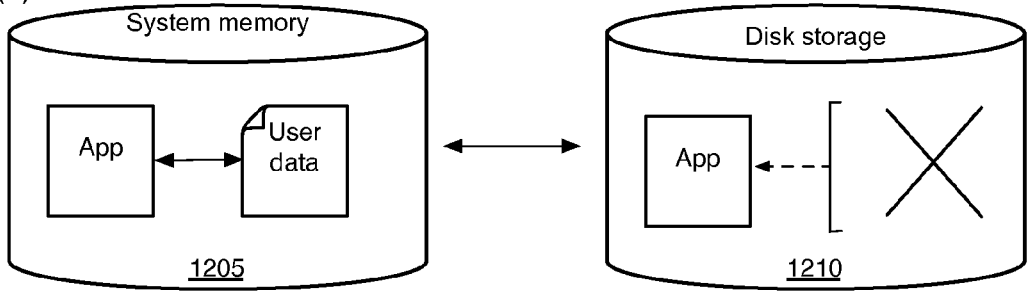

FIGS. 7 and 10 illustrate that an application may store and access one or more data files associated with the application (e.g., text documents for a text editing application, spreadsheets for a spreadsheet application, etc.). Different types of applications store and access these data files differently. FIG. 12 illustrates examples of different types of applications storing and accessing their associated data files. Specifically, FIG. 12 includes three examples. Each example illustrates an instance of the system memory 1205 when an application is running and an instance of the disk storage 1210 that stores the application.

Example 1 illustrates an example of a document based application. A document based application is an application that can run multiple instances at the same time where each instance represent a different data file of the application. Examples of document based applications include a text editing application, a spreadsheet application, etc. As shown in Example 1, the document based application has stored four documents in the disk storage 1210. As mentioned above, a document based application may open and access multiple data files at the same time. In this example, the application has loaded and opened two of the four documents from the disk storage 1210 to the system memory 1205 (e.g., the text editing application opens two text documents from the disk storage). In some embodiments, when the archiver performs the archiving operation on the application, the archiver stores the persisted variables associated with each individual document in the respective document file in the disk storage.

Example 2 illustrates an example of a non-document based application. A non-document based application is an application that can run only one instance at a time, even though the application may store multiple associated data files in the disk storage 1210. An example of a non-document application is a game application. As shown in this example, the non-document based application has stored two user data files in the disk storage 1210. For a non-document based application such as a game application, these data files may include players' information such as game score and game level for each player of the game. However, because this is a non-document based application, the application may load and open only one data file in the system memory 1205 at a time, as shown in this example. In some embodiments, when the archiver performs the archiving operation on the application, the archiver also stores the persisted variables associated with each individual user data in the respective user data file in the disk storage.

Example 3 illustrates another example of a non-document based application. Unlike the non-document based application in Example 2, the non-document based application in Example 3 does not store any user data file in the disk storage 1210. As such, even though the application may create one or more data files in the system memory when the application is running, the content of the data files will be lost once the application terminates. For instance, a game application of some embodiments may store the player's score in the system memory while the player is using the game application. However, once the player terminates the game, the score will be lost the next time the player starts the game application. In some embodiments, when the archiver performs the archiving operation on this application, the archiver does not store any variables related to the user data in the disk storage.

The overall operation of the persister 120 will now be described by reference to FIG. 13. This figure presents the state diagram 1300 that represents various operations of the persister 120 in some embodiments. One of ordinary skill in the art will recognize that the state diagram does not describe all states of the persister 120, but instead specifically pertains to its operations during archiving and unarchiving of variables for a single application. The persister of some embodiments will normally operate to archive and unarchive variables for multiple applications and multiple documents of such applications.

Figure 13:
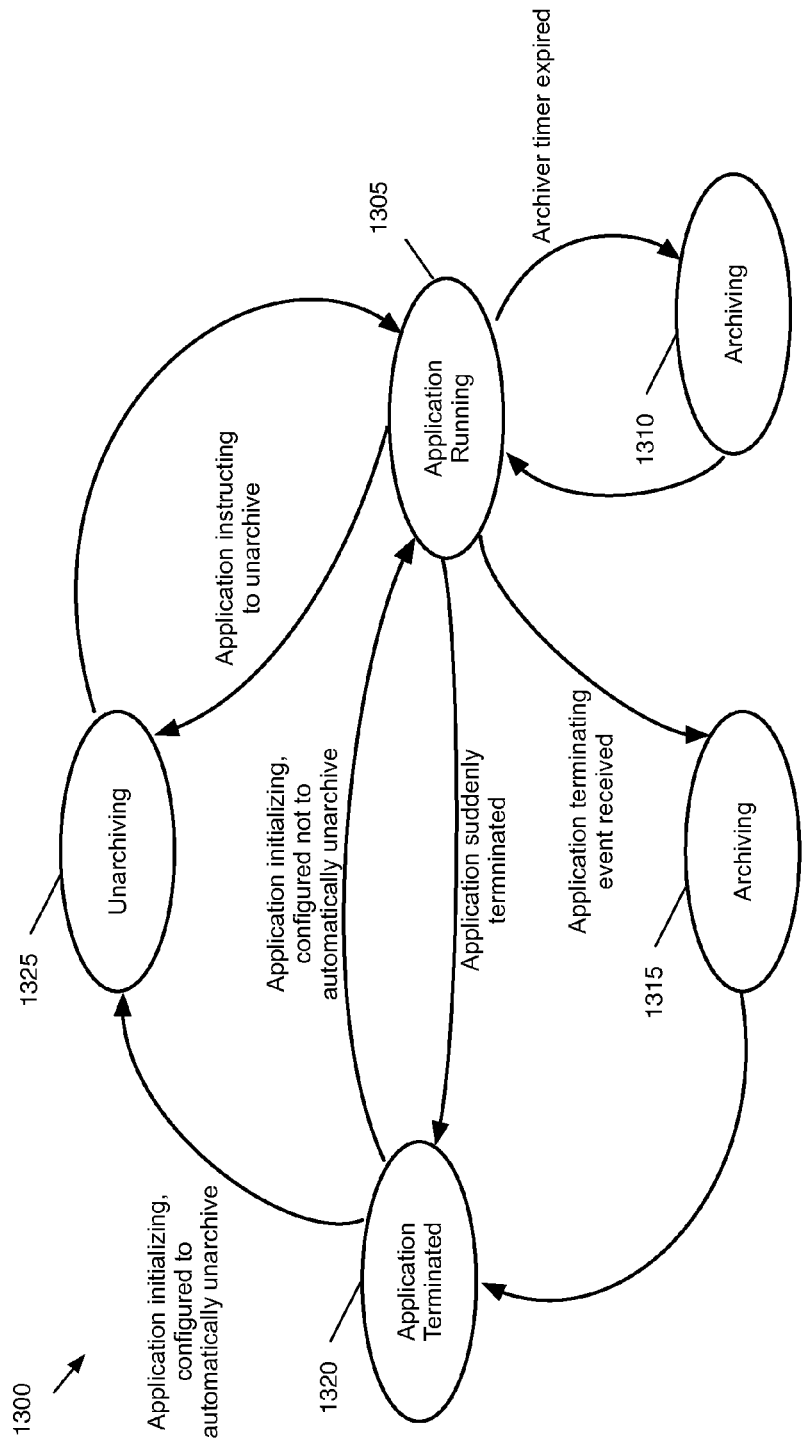
FIG. 13 conceptually illustrates a state diagram of a variable persister of some embodiments.

As shown in FIG. 13, an initial state of the persister is an application running state 1305. The persister enters this state after an application has been initiated. The persister stays at the application running state so long as (1) no application terminating event is received and (2) an archiver timer has not expired.

Upon the expiration of the timer, the persister transitions to the archiving state 1310. In the archiving state 1310, the persister of some embodiments retrieves and archives the persisted variables of the application. In some embodiments, the persister retrieves and archives the persisted variables using the process described above by reference to FIG. 8. When all the persisted variables of the application are archived, the persister returns to the application running state 1305 and resets the archiver timer.

When the persister receives an application terminating event while the persister is in the application running state (e.g., the user quitting the application, the user closing a document associated with the application, etc.), the persister transitions to the archiving state 1315. Similar to the archiving state 1310, the persister in the archiving state 1315 retrieves and archives the persisted variables of the application. In some embodiments, the persister retrieves and archives the persisted variables using the process described above by reference to FIG. 5. When all the persisted variables of the application are archived and the application completely terminated, the persister transitions from the archiving state 1315 to the application terminated state 1320.

The persister stays at the application terminated state 1320 so long as no application initializing event is received. When the persister receives an application initializing event (e.g., the user initiating an application, the user closing a document associating with the application, etc.), the persister may transition to one of two states. If the persister is configured to automatically unarchive the persisted variables when the application restarts, the persister transitions to the unarchiving state 1325. In the unarchiving state 1325, the persister retrieves the archived variables from the disk and updates the instantiated objects of the application. In some embodiments, the persister retrieves the archived variables and updates the objects using the process described above by reference to FIG. 9. After the persister restores the persisted variables of the application, the persister transitions to the application running state 1305.

If the persister is configured not to automatically unarchive the persisted variables, the persister transitions directly to the application running state 1305. At the application running state 1305, the persister transitions to the unarchiving state 1325 only when instructed to unarchive (unloading and restoring) the persisted variables by the application. After unarchiving, the persister returns back to the application running state 1305.

When the persister is at the application running state 1305, the application may abnormally terminate (e.g., the application crashing or suddenly terminating due to other circumstances such as the operating system performing a fast shutdown of the device that runs the application). When the application abnormally terminates, the persister transitions to the application terminated state 1320. Even though the persister does not archive the persisted variables when the application abnormally terminates, the application is still able to restore the values of the persisted variables that were last archived during the last periodically archiving.

II. Software Architecture

Figure 14:
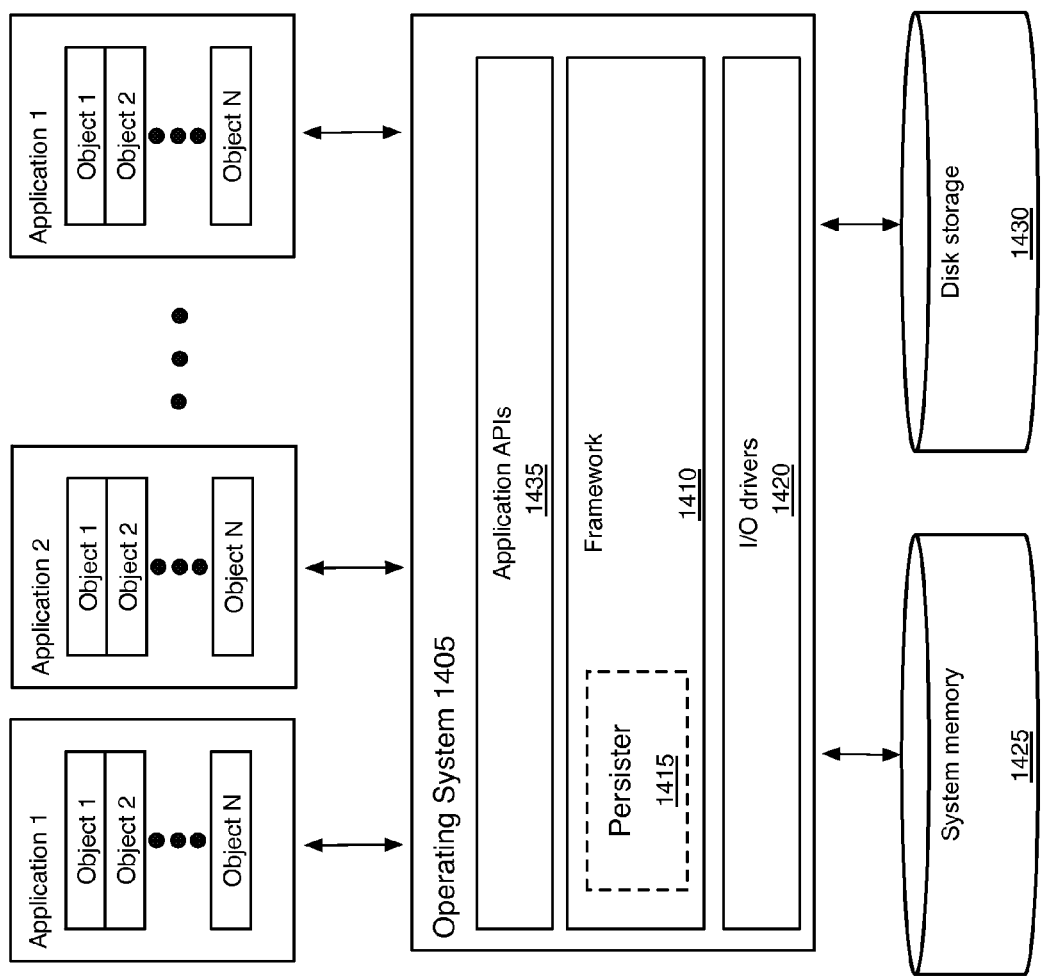
FIG. 14 conceptually illustrates a software architecture of an operating system that includes a variable persister of some embodiments.

In some embodiments, the processes described above are implemented as software running on a particular machine or device, or stored in a machine readable medium. In some embodiments, the machine or device on which the processes are implemented may be a desktop computer, laptop computer, a tablet, a smartphone, etc. FIG. 14 conceptually illustrates the software architecture of an operating system 1405 of some embodiments that includes a persister. In some embodiments, the persister is part of the framework (e.g., within the core services layer) of an operating system for providing the core functions to the application.

As shown, the operating system 1405 includes a set of application APIs 1435, a framework 1410, and input/output drivers 1420. The operating system 1405 interacts with the applications through the set of application APIs 1435. The operating system 1405 also accesses the system memory 1425 and the disk storage 1430 through the input/output (I/O) drivers 1420. As shown in the figure, the framework 1410 of the operating system 1405 includes a persister 1415.

In some embodiments, the persister performs an archiving operation for an application that is running on top of the operating system using the process described above by reference to FIGS. 5, 6, and 7. In some embodiments, the persister automatically performs the archiving operation when the application terminates. In some embodiments, the persister also performs the archiving operation periodically when the application is running. To perform the archiving operation for an application, the persister communicates with the application and retrieves the latest values of the persisted variables of the application from the system memory 1425. The persister then stores the persisted variables in the disk storage 1430 through the I/O drivers 1420. When the application restarts, the persister of some embodiments performs an unarchiving operation for the application using the process described above by reference to FIGS. 9 and 10. The persister retrieves the persisted variables from the disk storage 1430 through the I/O drivers 1420 and applies the retrieved persisted variables to the objects that the application has instantiated in the system memory 1425.

FIG. 14 only illustrates an example architecture of the operating system 1405 of some embodiments. In this example, the persister 1415 resides within the framework 1410 of the operating system 1405. However, in some other embodiments, the persister 1415 may reside in another layer within the operating system 1405 and provide services to the applications that executes on top of the operating system 1405 through the application APIs 1435. In other embodiments, the persister 1415 does not reside within the operating system 1405, but is an application that runs (i.e., executing) on top of the operating system 1405. In these embodiments, the operating system 1405 calls functions of the persister application to archive or unarchive persisted variables of other applications.

Figure 15:
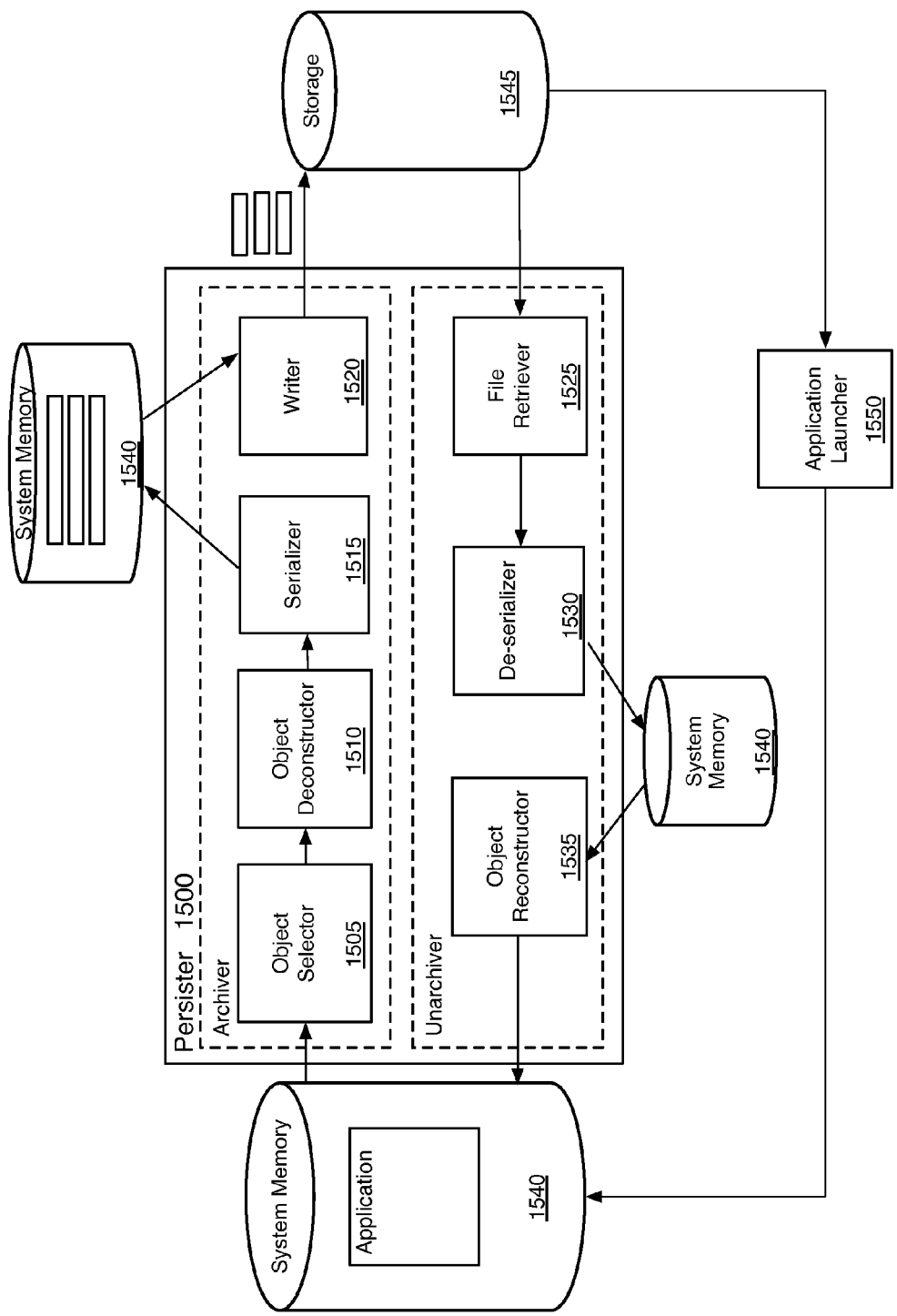
FIG. 15 conceptually illustrates a software architecture of a variable persister of some embodiments.

FIG. 15 illustrates the software architecture of a persister 1500 of some embodiments. As shown, the persister 1500 includes an object selector 1505, an object deconstructor 1510, a serializer 1515, a writer 1520, a file retriever 1525, a de-serializer 1530, and an object reconstructor 1535. When the persister 1500 begins the archiving operation for an application, the object selector 1505 selects the objects of the application from the system memory 1540. The object selector 1505 passes the objects to the object deconstructor 1510. The object deconstructor 1510 deconstructs the objects received from the object selector 1505 and retrieves the variables that the application has declared to be persistent from the objects. After retrieving all persisted variables from the objects, the object deconstructor 1510 passes the persisted variables to the serializer 1515.

In some embodiments, the persister 1500 archives all of the persisted variables of the application to a single file. In these embodiments, the serializer 1515 combines the received persisted variables into one stream of data and saves the stream of data in the system memory 1540. In some embodiments, the system memory 1540 is the same system memory that stores the application. The writer 1520 retrieves the stream of data from the system memory 1540 and writes the stream of data to a single file in the data storage 1545. In some embodiments, the writer 1520 converts the stream of data into a different format before writing the stream of data to the disk storage 1545. In other embodiments, the writer 1540 writes the stream of data to the data storage 1545 in the same format that the writer 1540 retrieves from the system memory 1540.

In other embodiments, the persister archives the persisted variables to different files based on the type of the persisted variables. For instance, the persister may archive variables that represent settings of the application (e.g., the appearance of the application's GUI) to the application settings file, and archive variables that represent user generated data (e.g., documents, spreadsheet, other data files, etc.) and application state data related to the user generated data (e.g., location of the cursor for an instance of the user generated data) to the user data files. In these embodiments, the serializer 1515 creates different streams of data for the different types of variables and saves the streams of data in the system memory 1540. The writer 1520 retrieves the multiple streams of data from the system memory 1540 and writes them to the respective application setting file and user data files of the application.

When the user restarts the application, the application launcher 1550 loads the application from the disk storage 1545 to the system memory 1540 and instantiates all the variables with default values. The initiation of the application also triggers the persister 1500 to perform the unarchiving operation for the application. When the persister begins the unarchiving operation for the application, the file retriever 1525 retrieves the streams of data from the files containing the persisted variables of the application in the disk storage 1545. The file retriever 1525 passes the streams of data to the de-serializer 1530. Upon receiving the streams of data, the de-serializer coverts the streams of data to the set of persisted variables of the application and stores the set of persisted variables in the system memory 1540. In some embodiments, the system memory 1540 is the same system memory that stores the loaded application. The object reconstructor 1535 uses the set of persisted variables in the system memory 1540 to update the instantiated objects of the application (i.e., overwriting some of the objects with the retrieved persisted variables).

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
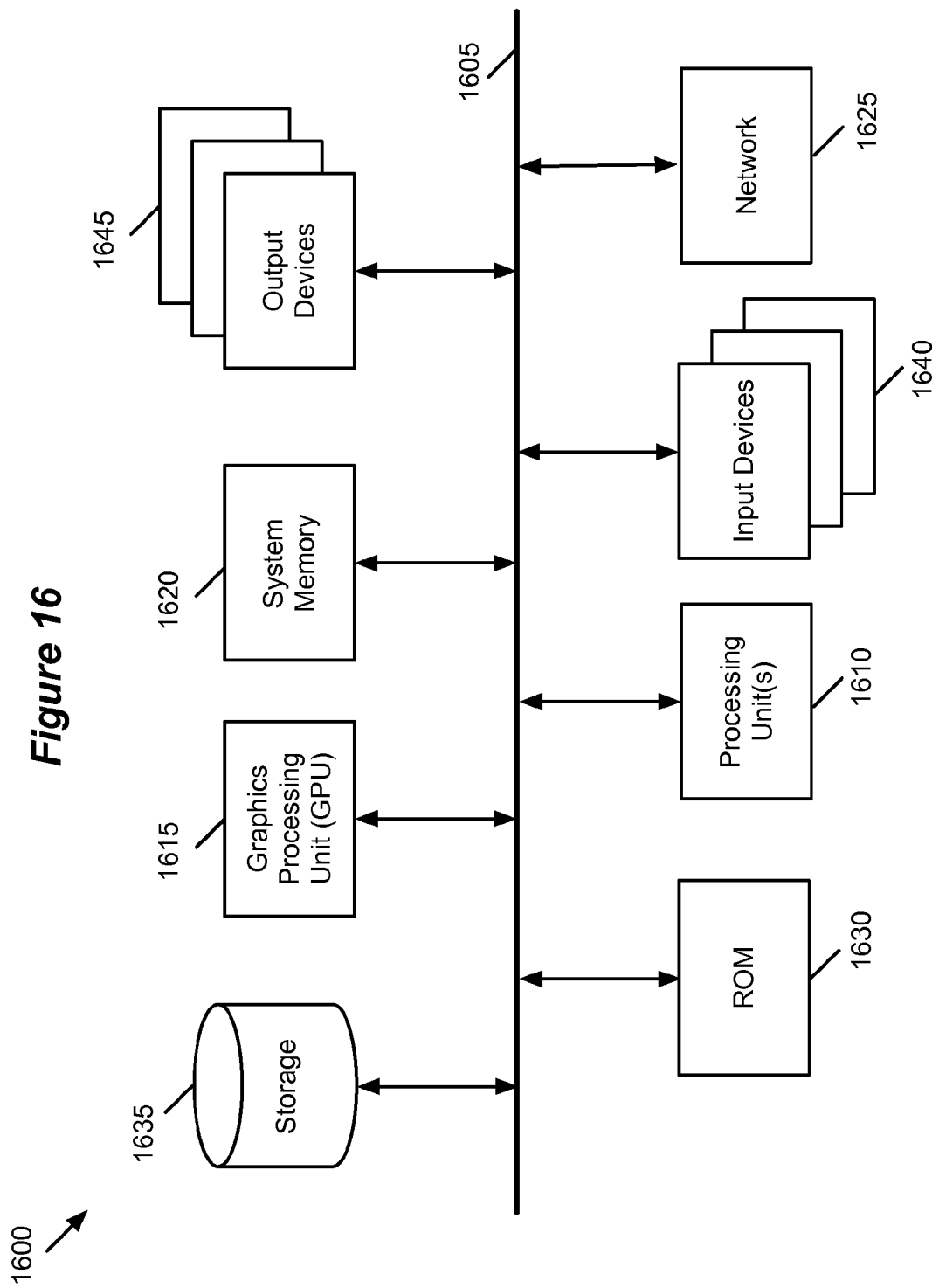
FIG. 16 conceptually illustrates an electronic system with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610. In some embodiments, such functionality can be provided using CoreImage's kernel shading language.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding disk drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 8, 9, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for archiving particular data of an application while the application is executing, the method comprising:

identifying a set of variables associated with the application, wherein each variable in the set of variables is marked as a persistent variable to be periodically archived to a non-volatile storage, and each variable in the set of variables indicates a particular manner selected from a plurality of manners in which the variable is to be archived to the non-volatile storage; and during execution of the application and when the application is terminating:
- selecting, from a system memory, one or more objects associated with the application, wherein the one or more objects comprises the set of variables,
- retrieving, from the one or more objects, a latest value for each variable in the set of variables,
- generating one or more streams of data by combining the latest value for each variable in the set of variables into the one or more streams of data,
- saving the one or more streams of data in the system memory,
- deconstructing the one or more objects, wherein deconstructing the one or more objects comprises disengaging at least one object of the one or more objects from other objects of the one or more objects, and
- archiving, according to the particular manners associated with the set of variables, the one or more streams of data to the non-volatile storage.

2. The method of claim 1, wherein archiving the one or more streams of data comprises retrieving the one or more streams of data from the system memory and writing the one or more streams of data to a set of files that are stored in the non-volatile storage.

3. The method of claim 1, wherein the set of variables includes variables that represent settings of the application, variables that represent values of one or more instances of a data file associated with the application, and variables that represent state data of the application related to a user interaction with the application.

4. The method of claim 3, wherein at least one stream of data of the one or more streams of data that includes one or more latest values for the set of variables that represent settings of the application is written to a settings file stored on the non-volatile storage and associated with the application.

5. The method of claim 1, wherein, subsequent to the termination of the application, and when the application is initiating, a value for each variable in the set of variables is updated with the latest value for the variable stored on the non-volatile storage.

6. The method of claim 1, wherein, within programming code of the application, each variable in the set of variables is declared as the persistent variable using a particular keyword selected from a set of keywords.

7. The method of claim 1, wherein each variable in the set of variables comprises a key and a value.

8. The method of claim 7, wherein each variable in the set of variables further comprises an attribute that indicates the variable is marked as persistent.

9. The method of claim 1, wherein at least one manner of the plurality of manners includes archiving to a local non-volatile storage.

10. The method of claim 1, wherein at least one manner of the plurality of manners includes archiving to a networked non-volatile storage.

11. A method for restoring an application to a particular state based on archived data associated with the application, the method comprising:
- receiving an initiation event of the application;
- retrieving one or more streams of data from a non-volatile storage, wherein the one or more streams of data comprises a set of variables associated with the application;
- converting the one or more streams of data to a set of persisted variables associated with the application, wherein the one or more streams of data comprises a latest value for each variable in the set of persisted variables associated with the application, wherein each variable in the set of persisted variables is marked as a variable that was periodically archived to the non-volatile storage, each variable in the set of persisted variables indicates a particular manner selected from a plurality of manners in which the variable was archived to the non-volatile storage, and the one or more streams of data is retrieved according to the particular manners indicated by the set of persisted variables;
- storing the latest value for each variable in the set of persisted variables in a system memory;
- selecting one or more instantiated objects associated with the application, wherein each instantiated object of the one or more instantiated objects comprises at least one variable of the set of persisted variables; and
- updating a value of the at least one variable of each instantiated object with the latest value for the at least one variable retrieved from the system memory.

12. The method of claim 11, wherein retrieving the one or more streams of data comprises retrieving the one or more streams of data from a set of data files that are stored on the non-volatile storage.

13. The method of claim 11, wherein the latest value for each variable in the set of persisted variables was archived in the non-volatile storage at a time that the application was last terminated.

14. The method of claim 11, wherein the latest value for each variable in the set of persisted variables was archived in the non-volatile storage at a last periodic interval when the application was executing.

15. The method of claim 11, wherein, prior to updating the value of the at least one variable of each instantiated object, the at least one variable was assigned with a default value by the application during the initiation event.

16. A non-transitory computer-readable storage medium storing instructions that, when executed by a processor, cause the processor to archive particular data of an application while the application is executing, by carrying out the steps of:
- identifying a set of variables associated with the application, wherein each variable in the set of variables is marked as a persistent variable to be periodically archived to a non-volatile storage, and each variable in the set of variables indicates a particular manner selected from a plurality of manners in which the variable is to be archived to the non-volatile storage; and
- during execution of the application and when the application is terminating:
  - selecting, from a system memory, one or more objects associated with the application, wherein the one or more objects comprises the set of variables,
  - retrieving, from the one or more objects, a latest value for each variable in the set of variables,
  - generating one or more streams of data by combining the latest value for each variable in the set of variables into the one or more streams of data,
  - saving the one or more streams of data in the system memory,
  - deconstructing the one or more objects, wherein deconstructing the one or more objects comprises disengaging at least one object of the one or more objects from other objects of the one or more objects, and
  - archiving, according to the particular manners associated with the set of variables, the one or more streams of data to the non-volatile storage.

17. The non-transitory computer-readable storage medium of claim 16, wherein archiving the latest values comprises retrieving the one or more streams of data from the system memory and writing the one or more streams of data to a set of files that are stored in the non-volatile storage.

18. The non-transitory computer-readable storage medium of claim 16, wherein the set of variables includes variables that represent settings of the application, variables that represent values of one or more instances of a data file associated with the application, and variables that represent state data of the application related to a user interaction with the application.

19. The non-transitory computer-readable storage medium of claim 18, wherein at least one stream of data of the one or more streams of data that includes one or more latest values for the set of variables that represent settings of the application is written to a settings file stored on the non-volatile storage and associated with the application.

20. The non-transitory computer-readable storage medium of claim 16, wherein, within programming code of the application, each variable in the set of variables is declared as the persistent variable using a particular keyword selected from a set of keywords.

21. The non-transitory computer-readable storage medium of claim 16, wherein each variable in the set of variables comprises a key and a value.

22. The non-transitory computer-readable storage medium of claim 21, wherein each variable in the set of variables further comprises an attribute that indicates the variable is marked as persistent.

23. The method of claim 2, wherein the one or more streams of data is converted into a different format prior to writing the one or more streams of data to the set of files.

24. The method of claim 2, wherein different streams of data are generated for different types of variables in the set of variables and the different streams of data are archived to different files in the set of files.

* * * * *